US012619217B2

(12) United States Patent
Tennoji

(10) Patent No.: US 12,619,217 B2
(45) Date of Patent: May 5, 2026

(54) METHOD OF MANAGING MANUFACTURING LINE

(71) Applicant: Kioxia Corporation, Tokyo (JP)

(72) Inventor: Teruhiko Tennoji, Yokkaichi (JP)

(73) Assignee: Kioxia Corporation, Tokyo (JP)

( * ) Notice: Subject to any disclaimer, the term of this patent is extended or adjusted under 35 U.S.C. 154(b) by 368 days.

(21) Appl. No.: 18/335,682

(22) Filed: Jun. 15, 2023

(65) Prior Publication Data

US 2024/0103500 A1     Mar. 28, 2024

(30) Foreign Application Priority Data

Sep. 21, 2022    (JP) ................................. 2022-150660

(51) Int. Cl.
    *G06F 19/00*      (2018.01)
    *G05B 19/418*    (2006.01)

(52) U.S. Cl.
    CPC ... *G05B 19/41865* (2013.01); *G05B 19/4183* (2013.01)

(58) Field of Classification Search
    CPC .......... G05B 19/4183; G05B 19/41865; G05B 2219/32015
    See application file for complete search history.

(56) References Cited

U.S. PATENT DOCUMENTS

| | | | | |
|---|---|---|---|---|
| 5,825,650 A | * | 10/1998 | Wang ............... | G05B 19/41865 |
| | | | | 700/121 |
| 5,950,170 A | * | 9/1999 | Pan .................. | G06Q 10/06312 |
| | | | | 700/121 |
| 8,423,168 B2 | | 4/2013 | Nonaka et al. | |
| 10,734,261 B2 | | 8/2020 | Ohmori et al. | |
| 2009/0192643 A1 | | 7/2009 | Endo et al. | |
| 2020/0226505 A1 | * | 7/2020 | Oda ..................... | G06Q 10/047 |
| 2021/0366749 A1 | | 11/2021 | Rhee | |

FOREIGN PATENT DOCUMENTS

| | | |
|---|---|---|
| JP | 2001-344012 A | 12/2001 |
| JP | 2003-109885 A | 4/2003 |
| JP | 2003-162313 A | 6/2003 |
| JP | 3563230 B2 | 9/2004 |
| JP | 4019462 B2 | 12/2007 |
| JP | 2009-170776 A | 7/2009 |
| WO | WO 2008/062515 A1 | 5/2008 |

* cited by examiner

*Primary Examiner* — Yong J Choe
(74) *Attorney, Agent, or Firm* — Oblon, McClelland, Maier & Neustadt, L.L.P.

(57) ABSTRACT

According to one embodiment, there is provided a method of managing a manufacturing line. The method comprises obtaining a capability variation characteristic of each resource based on a throughput result of a process area among multi process areas arranged in the manufacturing line, each of the process areas including a multi resources. The method comprises determining number of additional resources for achievement of a quota in the process area based on the number of resources in the process area and the obtained capability variation characteristic.

20 Claims, 14 Drawing Sheets

FIG.1

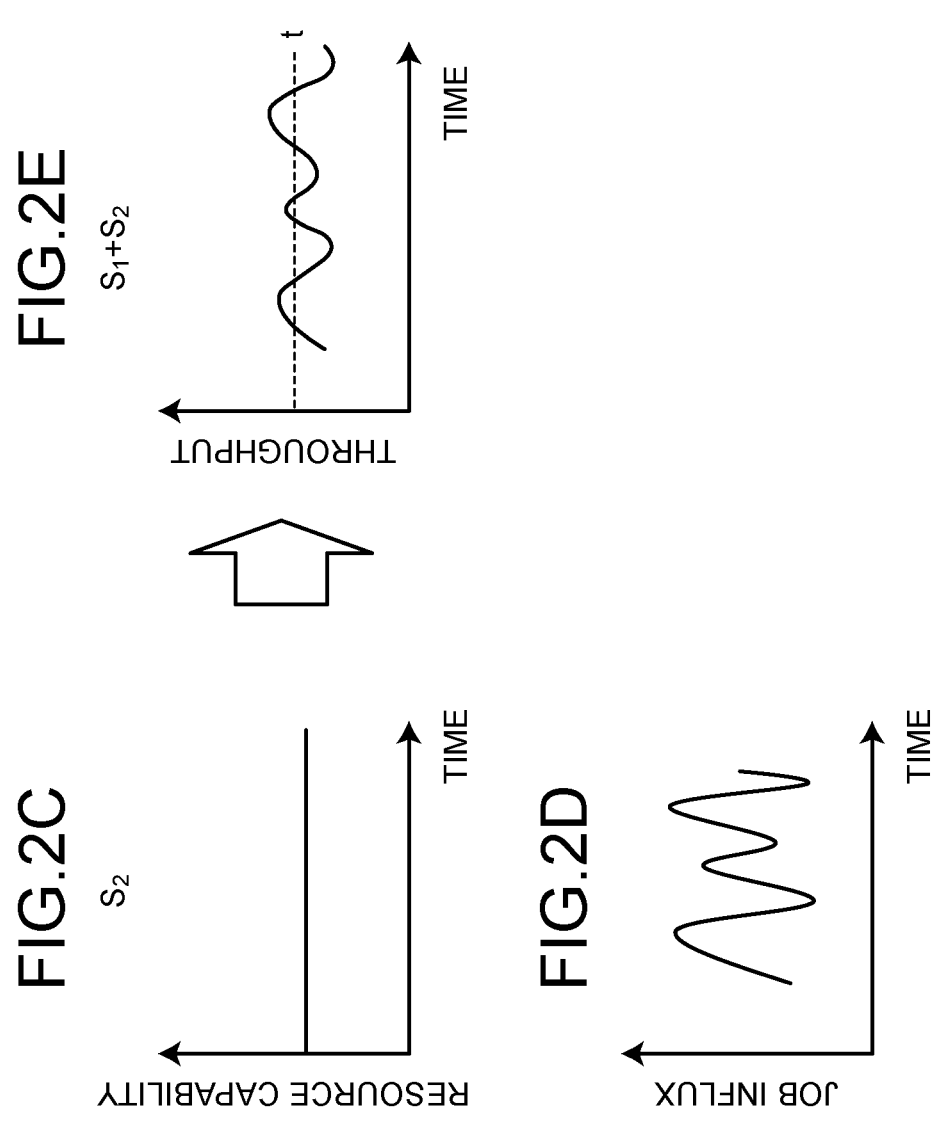
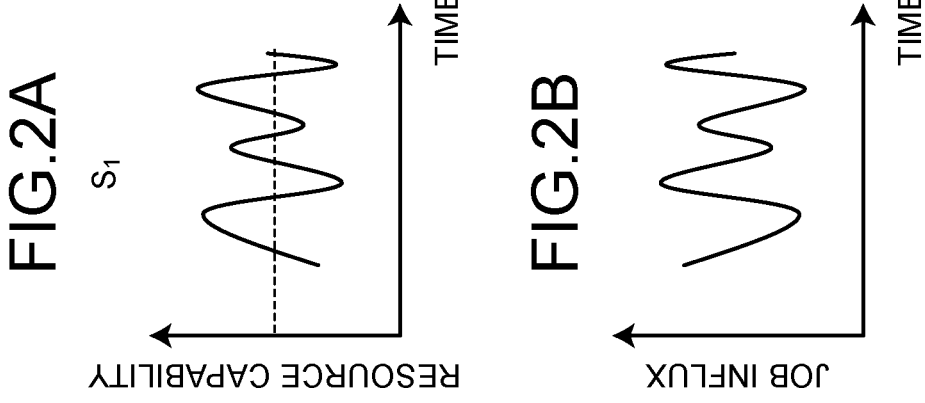

$$k\sqrt{\sum_{i=1}^{n} \sigma_i^2}$$

p%

$\mu_p$     $\mu_{avg}$

SMALL←THROUGHPUT→LARGE

LOW←OCCURRENCE PROBABILITY→HIGH p-k CORRESPONDENCE TABLE

| p | 99.9 | 97.7 | 95.0 | 90.0 | 84.1 |
|---|------|------|------|------|------|
| k | 3.00 | 2.00 | 1.65 | 1.28 | 1.00 |

FIG.14

| RATE OF OPERATION | QUOTA Pitch | RP_1 69 | RP_2 69 | RP_3 69 |
|---|---|---|---|---|
| 0.80 | E1 | 20 | 30 | 24 |
| 0.80 | E2 | 20 | 30 | 24 |
| 0.80 | E3 | 20 | 30 | 24 |
| 0.80 | E4 | 20 | 30 | 24 |
| 0.80 | E5 | 20 | - | 24 |
| | NUMBER OF NECESSARY RESOURCES | 5 | 4 | 5 |
| | RECIPROCAL | 0.20 | 0.25 | 0.20 |

CAL-CU-LATE

| | PROCESSING CAPABILITY | RP_1 | RP_2 | RP_3 | OPER-ATION TIME |
|---|---|---|---|---|---|
| | E1 | 15.0 | 18.4 | 12.4 | 1,152 |
| | E2 | 15.0 | 18.4 | 12.4 | 1,152 |
| | E3 | 15.0 | 18.4 | 12.4 | 1,152 |
| | E4 | 15.0 | 18.4 | 12.4 | 1,152 |
| | E5 | 28.8 | - | 24.0 | 1,152 |
| | PROCESSING CAPABILITY METER | 88.8 | 73.6 | 73.6 | |
| | PROCESSING CAPABILITY METER ÷ QUOTA | 1.28 | 1.06 | 1.06 | |

METHOD OF MANAGING MANUFACTURING LINE

CROSS-REFERENCE TO RELATED APPLICATIONS

This application is based upon and claims the benefit of Japanese Patent Application No. 2022-150660, filed on Sep. 21, 2022; the entire contents of which are incorporated herein by reference.

FIELD

Embodiments described herein relate generally to a method of managing a manufacturing line.

BACKGROUND

In a manufacturing line, when a job is input to a process area including multi resources, the resources operate to process the job. In the manufacturing line, it is desirable to be able to efficiently process the job.

BRIEF DESCRIPTION OF THE DRAWINGS

FIG. 1 is a diagram illustrating a configuration of a manufacturing line according to a first embodiment;

FIGS. 2A to 2E are diagrams illustrating variations in resource throughput and job influx according to the first embodiment;

FIG. 14 is a diagram illustrating an operation of the management system according to the third embodiment;

DETAILED DESCRIPTION

Figure 3:
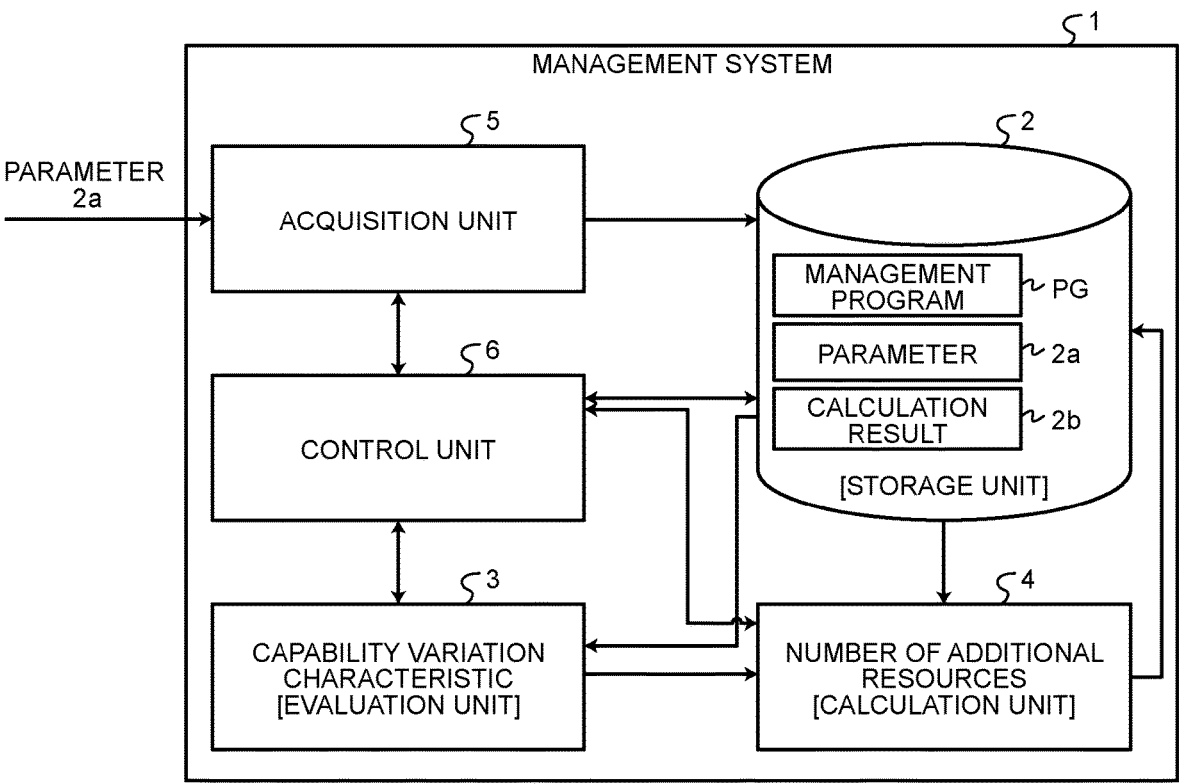
FIG. 3 is a diagram illustrating a functional configuration of a management system according to the first embodiment.

In general, according to one embodiment, there is provided a method of managing a manufacturing line. The method comprises obtaining a capability variation characteristic of each resource based on a throughput result of a process area among multi process areas arranged in the manufacturing line, each of the process areas including a multi resources. The method comprises determining number of additional resources for achievement of a quota in the process area based on the number of resources in the process area and the obtained capability variation characteristic.

Exemplary embodiments of a method of managing a manufacturing line will be explained below in detail with reference to the accompanying drawings. The present invention is not limited to the following embodiments.

First Embodiment

A method of managing a manufacturing line according to a first embodiment manages the manufacturing line in which multi process areas are arranged. Each process area includes multi resources. In the manufacturing line, when a job is input to the process area, the resource operates to process the job. In the method of managing the manufacturing line, measures are taken to efficiently perform job processing in the manufacturing line. Here, the job refers to an object to be processed on the resource.

Figure 1:
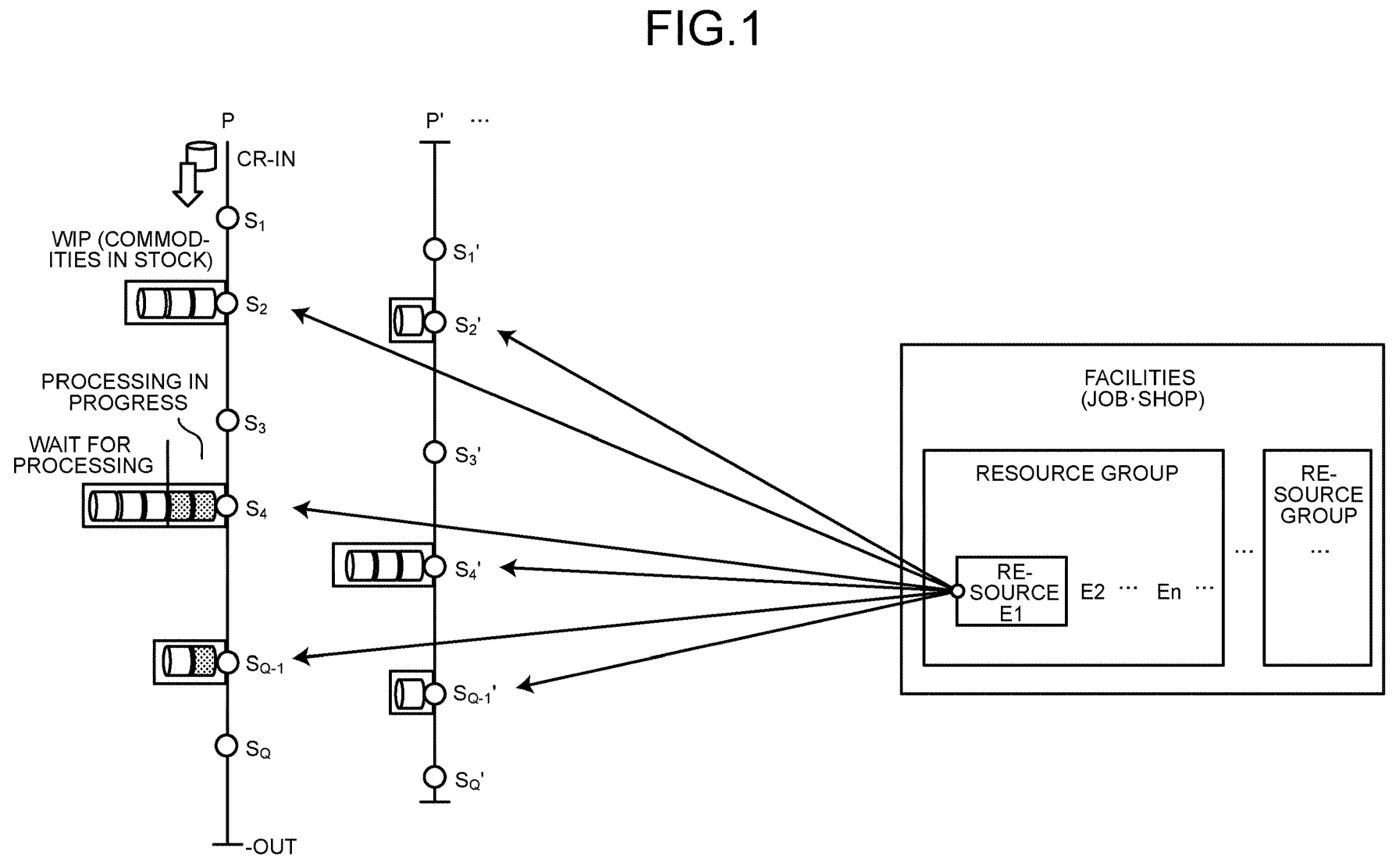

FIG. 1 is a diagram illustrating a configuration of the manufacturing line according to the first embodiment. In a manufacturing factory for manufacturing an object to be manufactured, there are multi manufacturing lines P and P'. Although two manufacturing lines P and P' are illustrated in FIG. 1, three or more manufacturing lines may be arranged in the manufacturing factory.

As illustrated in FIG. 1, multi process areas $S_1$, $S_2$, . . . , and $S_Q$ are arranged in the manufacturing line P. Q is an integer of two or more. The multi process areas $S_1$, $S_2$, . . . , $S_Q$ correspond to multi processes in the manufacturing method of the object to be manufactured. Similarly, multi process areas $S_1'$, $S_2'$, . . . , $S_Q'$ are arranged in the manufacturing line P'. When the object to be manufactured is a semiconductor device, multi processes include processes such as coating, exposure, development, etching, cleaning, impurity introduction, film formation, and heat treatment of a semiconductor substrate.

Hereinafter, one manufacturing line P will be mainly described, but the same applies to the other manufacturing line P'.

In each of the process areas $S_1$ to $S_Q$, one or more resources E are arranged from a resource group M. The resource group M includes multi resources Ei. i is an identifier of the resource E, and may be an integer of one or more. In a case where the object to be manufactured is a semiconductor device, each resource E is a semiconductor manufacturing device that performs processing of a process thereof. When the process is a coating process, the resource E includes a coating apparatus. When the process is an exposure process, the resource E includes an exposure apparatus. When the process is a developing process, the resource E includes a developing apparatus. When the process is an etching process, the resource E includes an etching apparatus. When the process is a cleaning process, the resource E includes a cleaning apparatus. When the process is an impurity introduction process, the resource E includes an ion implantation apparatus. When the process is a film formation process, the resource E includes a film formation apparatus. When the process is a heat treatment process, the resource E includes a heat treatment apparatus.

The manufacturing line P has a quota t to be achieved. The quota t indicates the number of products (for example, the number of substrates) to be output per unit time from the manufacturing line P. The unit time may be one day. The quota in each of the process areas $S_1$ to $S_Q$ may be equal to the quota t of the manufacturing line P. A difference in time required for processing among the multi process areas $S_1$ to $S_Q$ can be absorbed by changing the number of resources in each of the process areas $S_1$ to $S_Q$.

In the manufacturing line P, since capability of the resource E and a job influx to the resource E vary, throughput of the manufacturing line P may fail to achieve the quota t. The capability of the resource E is a processing rate of a job by the resource E, and indicates the number of jobs (for example, the number of substrates) that can be processed by the resource E per unit time. The job is an object (for example, a substrate) to be processed in the resource E. The unit time may be one day. The job influx indicates the number of jobs input to the resource E per unit time. The throughput of the manufacturing line P indicates the number of jobs output per unit time by the manufacturing line P.

For example, it is assumed that the manufacturing line P includes the process area $S_1$ and the process area $S_2$ illustrated in FIGS. 2A to 2E. FIGS. 2A to 2E are diagrams illustrating variations in resource capability and job influx. The process area $S_1$ and the process area $S_2$ are continuous processes.

In the process area $S_1$, the capability of the resource E varies over time as illustrated in FIG. 2A, and the job influx thereof varies over time as illustrated in FIG. 2B. In the next process area $S_2$, the capability of the resource E hardly varies over time as illustrated in FIG. 2C, but the job influx thereof varies over time as illustrated in FIG. 2D. In this case, the throughput of the manufacturing line P including the process areas $S_1$ and $S_2$ varies over time as illustrated in FIG. 2E, and sometimes the quota t cannot be achieved.

Each manufacturing line P as illustrated in FIGS. 1 and 2A to 2E can be managed by a management system 1 as illustrated in FIG. 3. FIG. 3 is a diagram illustrating a functional configuration of the management system 1. The management system 1 obtains a capability variation characteristic of each resource E based the throughput result of each process area S in the manufacturing line P. The management system 1 determines the number of additional resources for achieving the quota t in the process area S based on the number of resources of each process area S and the capability variation characteristic of each resource E. The management system 1 functionally includes a control unit 6, an acquisition unit 5, a storage unit 2, an evaluation unit 3, and a calculation unit 4.

The storage unit 2 stores a management program PG. The management program PG includes multi pieces of processing for performing predetermined management. The predetermined management includes management as to how many resources E should be added so that the quota t can be achieved in each process area S.

The control unit 6 integrally controls each unit of the management system 1 according to the management program PG. The acquisition unit 5 acquires a parameter 2a under the control of the control unit 6. The parameter 2a includes the number of resources, a history of throughput, a quota to be achieved, and the like in each of the process areas $S_1$ to $S_Q$ of the manufacturing line P. The acquisition unit 5 may acquire the parameter 2a in response to an input from a user. The acquisition unit 5 may acquire the parameter 2a via a communication medium such as a wired communication line or a wireless communication line.

The storage unit 2 may receive the parameter 2a from the acquisition unit 5 and store the received parameter 2a as a database under the control of the control unit 6. The database includes resource information, throughput information, quota information, and the like. The resource information is information in which the number of resources, an identifier of the manufacturing line P, and an identifier of the process area S are associated with each other for the multi manufacturing lines P and the multi process areas S. The throughput information is information in which time information, a throughput result, the identifier of the manufacturing line P, and the identifier of the process area S are associated with each other for the multi manufacturing lines P and the multi process areas S. The quota information is information in which the quota to be achieved, the identifier of the manufacturing line P, and the identifier of the process area S are associated with each other for the multi manufacturing lines P and the multi process areas S. In addition, the storage unit 2 may store a calculation result of the calculation unit 4.

The evaluation unit 3 performs evaluation under the control of the control unit 6. The evaluation unit 3 acquires the throughput information from the storage unit 2. The evaluation unit 3 can specify a throughput result of the process area S for each of the process areas $S_1$ to $S_Q$ of the manufacturing line P based on the throughput information. The evaluation unit 3 obtains the capability variation characteristic of each resource E in the process area S for each of the process areas $S_1$ to $S_Q$ based on the throughput result in the process area S. The evaluation unit 3 can analyze the throughput of each resource E as an output in accordance with the capability, and obtain a parameter indicating a characteristic of a distribution of the throughput (for example, an average value and a standard deviation) as a parameter indicating the capability variation characteristic of the resource E.

Figures 4A, 4B:
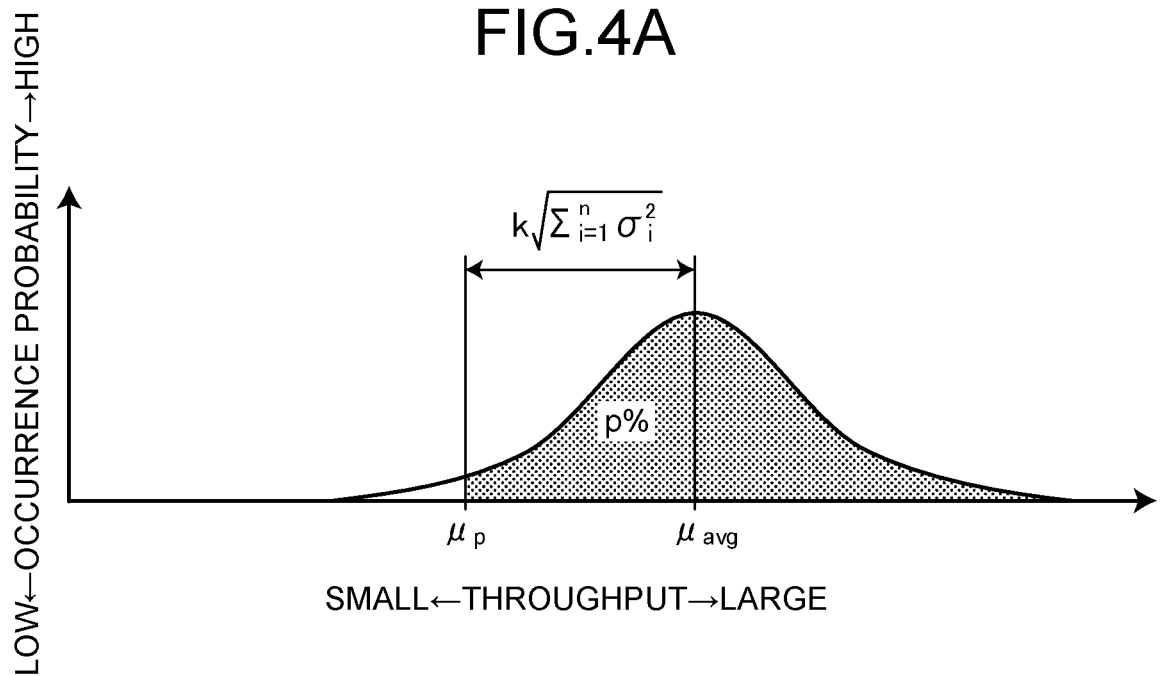
FIGS. 4A and 4B are diagrams illustrating a probability distribution of a throughput of a process area according to the first embodiment.

For example, it is assumed that n resources E1 to En are arranged in the process area $S_1$. n is the current number of resources. The distribution of the throughput of the n resources E can be regarded as a distribution of the occurrence probability of the throughput. The distribution of the throughput of the n resources E can be approximately considered to follow a normal distribution, as illustrated in FIG. 4A. FIGS. 4A and 4B are diagrams illustrating a probability distribution of throughput in the process area S. In FIG. 4A, the vertical axis represents an occurrence probability of throughput, and the horizontal axis represents the number of throughputs. Although FIG. 4A illustrates a distribution of an occurrence probability of the throughput for the n resources E1 to En, the occurrence probability of the throughput of each resource E can also be approximately considered to follow a normal distribution, as illustrated in FIG. 4A.

The evaluation unit 3 averages throughput results of the resource E1 in a predetermined period (for example, past three months) to obtain an average throughput $\mu1$ of the resource E1. The evaluation unit 3 takes the root mean square of a difference between the throughput result of the resource E1 and the average throughput $\mu1$ in the predetermined period, and obtains a standard deviation of of the throughput of the resource E1.

The evaluation unit 3 averages throughput results of the resource E2 in a predetermined period and obtains an average throughput $\mu2$ of the resource E2. The evaluation unit 3 takes the root mean square of a difference between the throughput result of the resource E2 and the average throughput μ2 in the predetermined period, and obtains a standard deviation σ2 of the throughput of the resource E2.

The evaluation unit 3 averages throughput results of the resource En in a predetermined period and obtains an average throughput μn of the resource En. The evaluation unit 3 takes the root mean square of a difference between the throughput result of the resource En and the average throughput μn in the predetermined period, and obtains a standard deviation σn of the throughput of the resource En.

The evaluation unit 3 illustrated in FIG. 3 can similarly obtain the capability variation characteristic of each resource E in the process area S for the other process areas $S_2$ to $S_Q$.

The evaluation unit 3 supplies the obtained capability variation characteristic to the calculation unit 4 together with the identification information of the process area S.

The calculation unit 4 performs calculation under the control of the control unit 6. The calculation unit 4 reads the number of resources in each of the process areas $S_1$ to $S_Q$ of the manufacturing line P from the storage unit 2. The calculation unit 4 acquires the capability variation characteristic of each resource E in each of the process areas $S_1$ to $S_Q$ of the manufacturing line P from the evaluation unit 3. For each of the process areas $S_1$ to $S_Q$, the calculation unit 4 determines the number of additional resources in the process area S for achieving the quota t in the process area S based on the number of resources in the process area S and the capability variation characteristic of the resource of the process area S.

For example, for the process area $S_1$, the calculation unit 4 can obtain the number of additional resources m for achieving the quota t as a number obtained by subtracting the current number of resources from the number of resources in which a boundary corresponding to p % of the entire throughput distribution of the resources E in the process area S is equal to or greater than the quota t. The calculation unit 4 can obtain the number of additional resources m for achieving the quota t for the process area $S_1$ as m that satisfies the following mathematical formula 1. The calculation unit 4 may obtain the number of additional resources m as the maximum integer m that satisfies the following mathematical formula 1.

$$\sum_{i=1}^{n+m} \mu_i - k\sqrt{\sum_{i=1}^{n+m} \sigma_i^2} \geq t \qquad \text{Mathematical Formula 1}$$

In mathematical formula 1, i represents an identifier of the resource E. i is a variable that can take a value (integer) of one or more and n+m or less.

μi (i=1 to n) is an average throughput of the resources E1 to En, and is acquired from the evaluation unit 3. μi (i=n+1 to m) is an average throughput of the resource Ei (i=n+1 to m) to be added, and is obtained by the calculation unit 4. The calculation unit 4 may average the average throughputs μ1 to μn of the resources E1 to En to obtain an average throughput μi (i=n+1 to m) of each resource Ei (i=n+1 to m) to be added.

σi (i=1 to n) is a standard deviation of the throughput of the resources E1 to En, and is acquired from the evaluation unit 3. of (i=n+1 to m) is a standard deviation of the throughput of the resource Ei (i=n+1 to m) to be added, and is obtained by the calculation unit 4. The calculation unit 4 may average the standard deviations σ1 to on of the throughput of the resources E1 to En to obtain a standard deviation σi (i=n+1 to m) of the throughput of each resource Ei (i=n+1 to m) to be added.

t is a quota in the process area $S_1$. The quota t can be extracted from the quota information read from the storage unit 2.

n is the number of resources in the process area $S_1$. The number of resources n can be extracted from information on the number of resources read from the storage unit 2.

k is a coefficient indicating a range (for example, p % of total in the distribution) to be covered for achieving the quota t in the distribution of the throughput of the resource E in the process area S. k is a coefficient corresponding to p. The range to be covered can be experimentally determined in advance and set in the calculation unit 4.

For example, it is assumed that the throughputs of the multi resources E1 to En in the process area $S_1$ are distributed as illustrated in FIG. 4A, and it is desired to cover p % of the entire throughput from the side on which the throughput is large in the distribution. Assuming that the throughput corresponding to p % is pp, the second term on the left side of mathematical formula 1 represents a distance from a throughput μavg at the center of the distribution to a throughput pp.

As illustrated in FIG. 4B, if p=99.9%, then k=3.00. If p=97.7%, then k=2.00. If p=95.0%, then k=1.65. If p=90.0%, then k=1.28. If p=84.1%, then k=1.00.

Similarly, for the process areas $S_2$ to $S_Q$, the calculation unit 4 obtains the number of additional resources m for achieving the quota t by mathematical formula 1. The calculation unit 4 supplies, to the storage unit 2, a calculation result 2b of the number of additional resources m in each of the process areas $S_1$ to $S_Q$.

As a result, the storage unit 2 stores the calculation result 2b of the number of additional resources m in each of the process areas $S_1$ to $S_Q$. The control unit 6 may notify a user of the calculation result 2b of the number of additional resources m in each of the process areas $S_1$ to $S_Q$ by a visual and/or auditory unit in response to the calculation result 2b being stored into the storage unit 2 or in response to a request or the like from the user.

Figure 5:
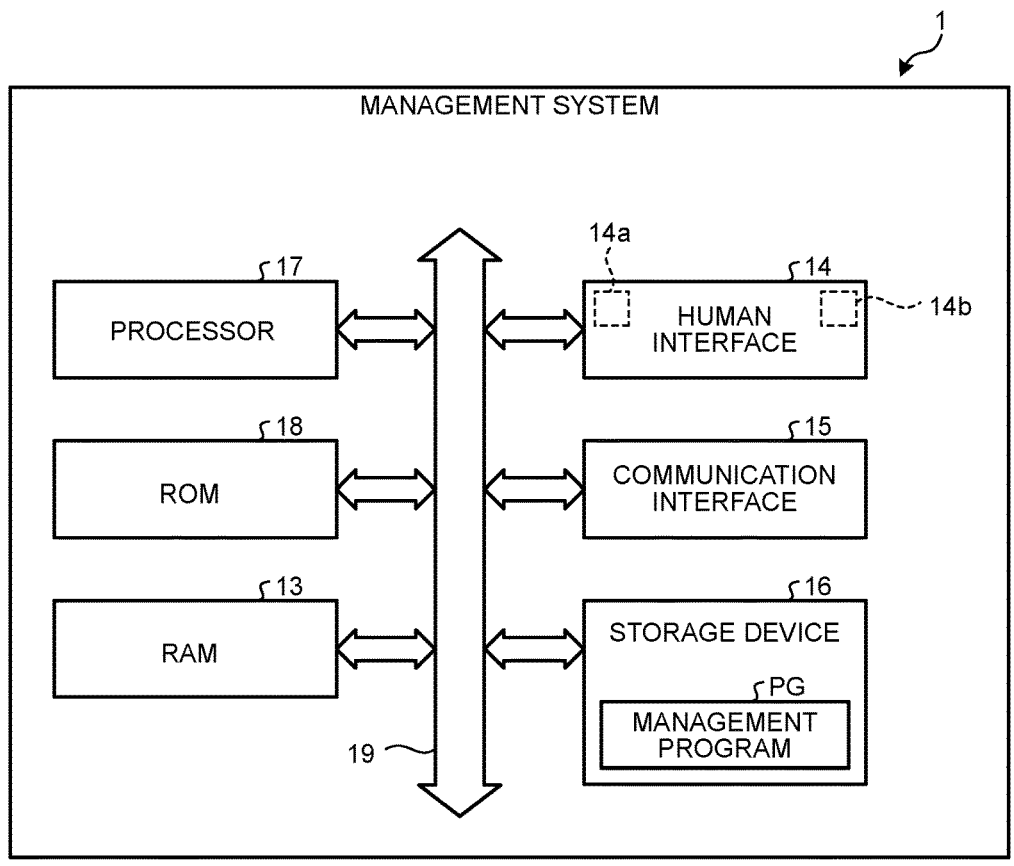
FIG. 5 is a diagram illustrating a hardware configuration of the management system according to the first embodiment.

The management system 1 can be implemented by a hardware as illustrated in FIG. 5. FIG. 5 is a diagram illustrating a hardware configuration of the management system 1.

The management system 1 includes, as the hardware configuration, a processor 17, a read only memory (ROM) 18, a random access memory (RAM) 13, a human interface 14, a communication interface 15, a storage device 16, and a bus 19.

The processor 17 includes a central processing unit (CPU) and the like. The processor 17 corresponds to the control unit 6, the evaluation unit 3, and the calculation unit 4. The control unit 6, the evaluation unit 3, and the calculation unit 4 are loaded on the RAM 13 collectively at the time of compilation or sequentially in accordance with the progress of processing by execution of the management program PG by the processor 17, and are functionally configured.

The ROM 18 stores fixed data. The ROM 18 corresponds to the storage unit 2.

The RAM 13 can temporarily store information and provides a work area or the like to the processor 17. The RAM 13 corresponds to the storage unit 2.

The human interface 14 mediates between a human and a computer. The human interface 14 includes an input device 14a and an output device 14b.

The input device 14a includes a device capable of accepting a request from a human, such as a keyboard, a mouse, or a touch panel. The input device 14a corresponds to the acquisition unit 5.

The output device 14*b* is a device capable of outputting visual and/or auditory information to a human, such as a display, a printer, a display, or a speaker.

The communication interface 15 can be connected to an external device via a communication medium. When the external device is connected thereto via the communication medium, the communication interface 15 can receive information from the external device or transmit information to the external device.

The storage device 16 is a device capable of storing information in a nonvolatile manner, such as a hard disk drive (HDD) or a solid state drive (SSD). The storage device 16 stores programs and various pieces of data for operating the processor 17. The storage device 16 may store the management program PG. The storage device 16 corresponds to the storage unit 2.

The processor 17, the ROM 18, the RAM 13, the human interface 14, the communication interface 15, and the storage device 16 are communicably connected to each other via the bus 19.

Figure 6:
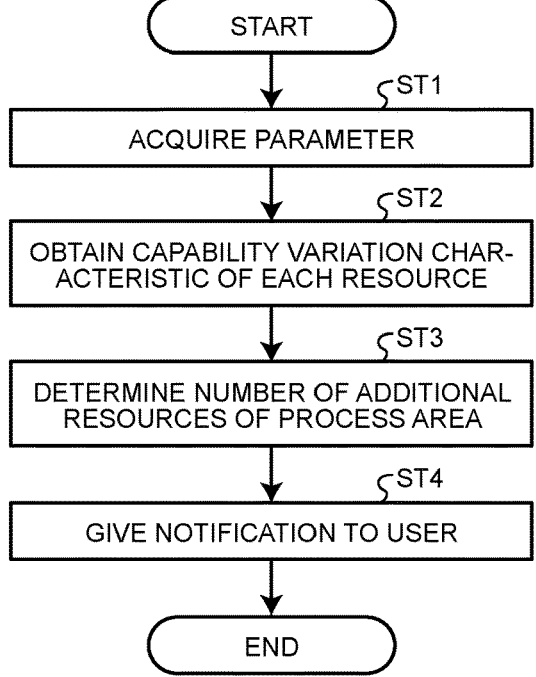
FIG. 6 is a flowchart illustrating an operation of the management system according to the first embodiment.

Next, an operation of the management system 1 will be described with reference to FIG. 6. FIG. 6 is a flowchart illustrating the operation of the management system 1.

In the management system 1, the acquisition unit 5 acquires the parameter 2*a* (ST1). For example, the acquisition unit 5 acquires the parameter 2*a* in response to an input from a user or via a communication medium such as a wired communication line or a wireless communication line. The parameter 2*a* includes the number of resources, a history of throughput, a quota to be achieved, and the like in each of the process areas $S_1$ to $S_Q$ of the manufacturing line P. The storage unit 2 may receive the parameter 2*a* from the acquisition unit 5 and store the parameter 2*a* as a database. The database includes resource information, throughput information, quota information, and the like.

The evaluation unit 3 obtains a capability variation characteristic of each resource E in each of the process areas $S_1$ to $S_Q$ (ST2). For example, the evaluation unit 3 acquires the throughput information. The evaluation unit 3 can specify a throughput result of the process area S for each of the process areas $S_1$ to $S_Q$ of the manufacturing line P based on the throughput information. The evaluation unit 3 obtains the capability variation characteristic of each resource E in the process area S for each of the process areas $S_1$ to $S_Q$ based on the throughput result in the process area S.

The calculation unit 4 determines the number of additional resources m in the process area S for achieving the quota t in the process area S based on the number of resources in each of the process areas $S_1$ to $S_Q$ and the capability variation characteristic obtained in ST2 (ST3).

For example, the calculation unit 4 reads information on the number of resources from the storage unit 2, and extracts the number of resources in each of the process areas $S_1$ to $S_Q$ of the manufacturing line P from the information on the number of resources. The calculation unit 4 acquires the capability variation characteristic of each resource E in each of the process areas $S_1$ to $S_Q$ of the manufacturing line P from the evaluation unit 3. For each of the process areas $S_1$ to $S_Q$, the calculation unit 4 determines the number of additional resources m in the process area S for achieving the quota t in the process area S based on the number of resources in the process area S and the capability variation characteristic of the resource E in the process area S. The calculation unit 4 may obtain the number of additional resources m for achieving the quota t in each of the process areas $S_1$ to $S_Q$ by mathematical formula 1. The calculation unit 4 may obtain the number of additional resources m as the maximum integer m that satisfies mathematical formula 1. The calculation unit 4 supplies, to the storage unit 2, a calculation result 2*b* of the number of additional resources m in each of the process areas $S_1$ to $S_Q$. The storage unit 2 stores the calculation result 2*b* of the number of additional resources m in each of the process areas $S_1$ to $S_Q$.

The control unit 6 notifies a user of the calculation result 2*b* of the number of additional resources m in each of the process areas $S_1$ to $S_Q$ (ST4). For example, the control unit 6 may notify the user of the calculation result 2*b* of the number of additional resources m in each of the process areas $S_1$ to $S_Q$ by a visual and/or auditory unit in response to the calculation result 2*b* being stored into the storage unit 2 or in response to a request from the user or the like.

As described above, in the first embodiment, in the management system 1, for each process area S of the manufacturing line P, the number of additional resources m for achieving the quota t in the process area S is determined based on the number of resources in the process area S and the capability variation characteristic in the process area S. As a result, the number of additional resources m in the process area S can be determined at an appropriate level, the determination result can be notified to the user, and the user can be urged to add resources at an appropriate level. Therefore, the number of resources for achieving the quota t can be secured for each manufacturing line P.

Note that a management system 1*a* according to a modification of the first embodiment may obtain an allowable throughput variation of the process area or each resource instead of the number of additional resource m. In this case, when resources can be added, the management system 1*a* determines the number of additional resources m in the process area S for achieving the quota t in the process area S, for example, based on the number of resources in the process area S and the capability variation characteristic of each resource E according to the procedure illustrated in FIG. 6. In a case where resources cannot be added, the management system 1*a* determines an allowable throughput variation of the process area S or each resource E for achieving the quota t in the process area S based on the number of resources in the process area S, as described below.

Figure 7:
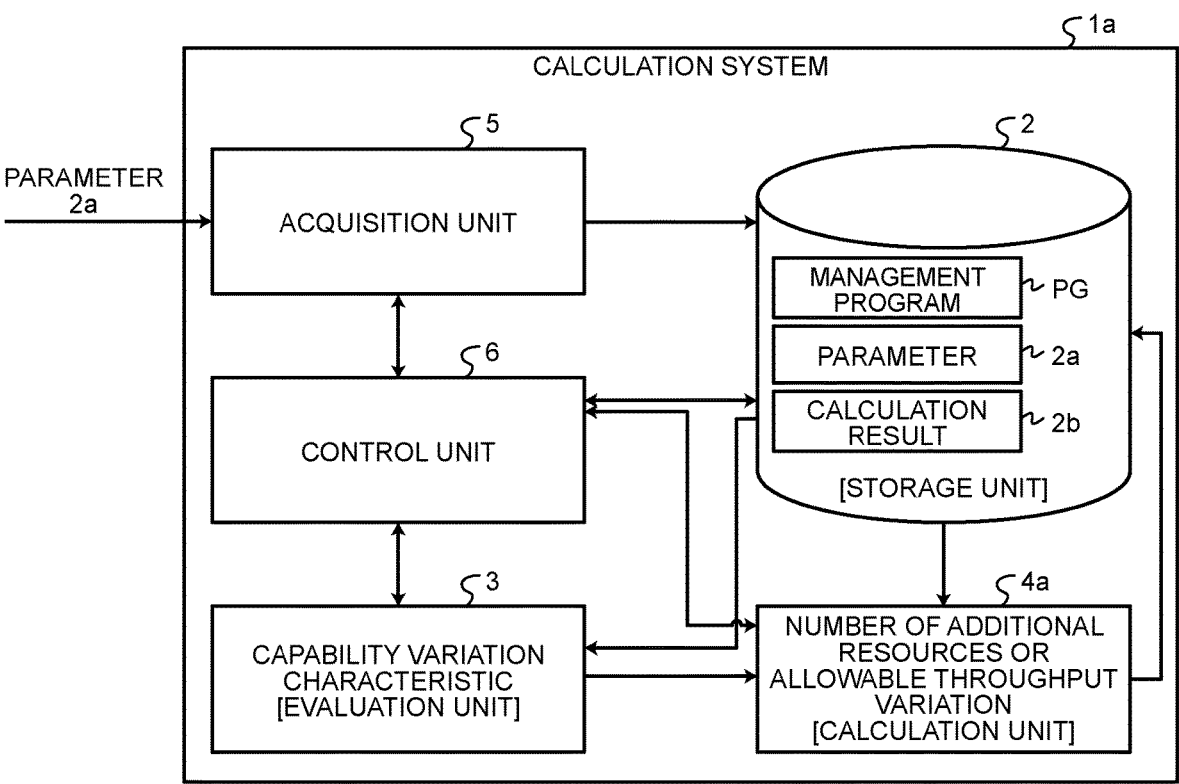
FIG. 7 is a diagram illustrating a functional configuration of a management system according to a modification of the first embodiment.

As illustrated in FIG. 7, the management system 1*a* includes a calculation unit 4*a* instead of the calculation unit 4 (refer to FIG. 3). FIG. 7 is a diagram illustrating a functional configuration of the management system 1*a* according to the modification of the first embodiment.

In the management system 1*a*, the control unit 6 determines whether or not a resource can be added, and supplies a determination result to the calculation unit 4*a*. When the resources can be added, the calculation unit 4*a* determines the number of additional resources m for achieving the quota t in the process area S based on the number of resources in the process area S and the capability variation characteristic obtained by the evaluation unit 3. When the resource cannot be added, the calculation unit 4*a* determines the allowable throughput variation of the process area or each resource for achieving the quota t in the process area S based on the number of resources in the process area S and the capability variation characteristic obtained by the evaluation unit 3.

For example, the calculation unit 4*a* can obtain, for the process area $S_1$, an allowable throughput variation $\Sigma\sigma^2$ of the process area $S_1$ for achieving the quota t as a variance that is allowed from an average throughput $\mu_{avg}$ to a throughput $\mu_t$ corresponding to the quota t corresponding to p % of the total from the side on which the throughput in the probability distribution is large. For the process area $S_1$, the calculation unit 4a can obtain the allowable throughput variation $\Sigma\sigma^2$ of the process area $S_1$ for achieving the quota t as $\Sigma\sigma^2$ that satisfies the following mathematical formula 2. The calculation unit 4a may obtain the allowable throughput variation $\Sigma\sigma^2$ of the process area $S_1$ as the maximum $\Sigma\sigma^2$ that satisfies the following mathematical formula 2.

$$\sum\nolimits_{i=1}^{n} \sigma_i^2 \leq \left( \frac{\sum_{i=1}^{n} \mu_i - t}{k} \right)^2 \qquad \text{Mathematical Formula 2}$$

In mathematical formula 2, μi (i=1 to n) is the average throughput of the resources E1 to En, and is acquired from the evaluation unit 3. μi (i=n+1 to m) is an average throughput of the resource Ei (i=n+1 to m) to be added, and is obtained by the calculation unit 4a.

t is a quota in the process area $S_1$. The quota t can be extracted from the quota information read from the storage unit 2.

n is the number of resources in the process area $S_1$. n is an integer of one or more. The number of resources n can be extracted from information on the number of resources read from the storage unit 2.

k is a coefficient indicating a range (for example, p % of total in the distribution) to be covered for achieving the quota t in the distribution of the throughput of the resource E in the process area S. The range to be covered can be experimentally determined in advance and set in the calculation unit 4a.

Figure 8:
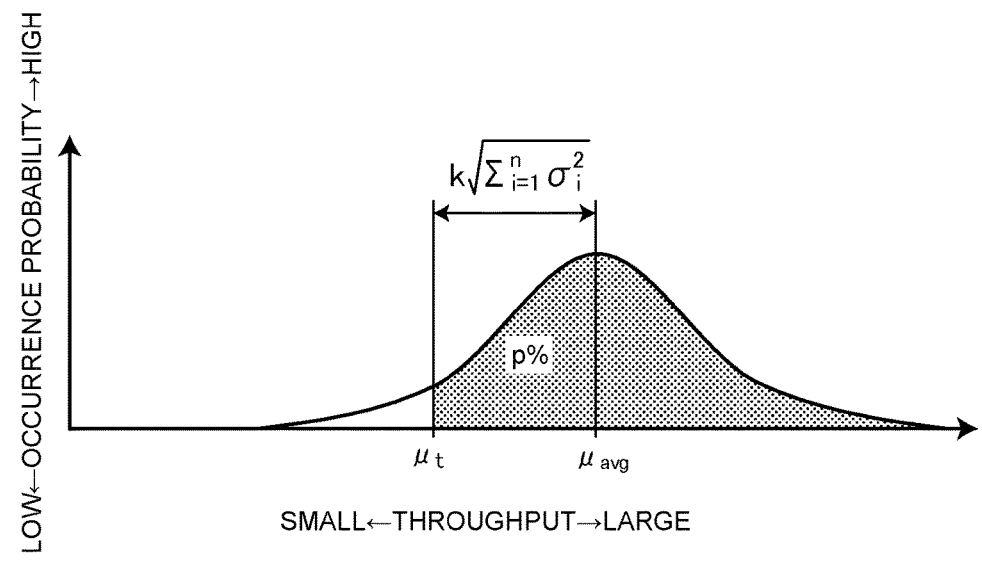
FIG. 8 is a diagram illustrating a probability distribution of a throughput of a process area according to the modification of the first embodiment.

For example, it is assumed that the throughputs of the multi resources E1 to En in the process area $S_1$ are distributed as illustrated in FIG. 8, and it is desired to cover p % of the entire throughput from the side on which the throughput is large in the distribution. FIG. 8 is a diagram illustrating a probability distribution of the throughput in the process area S. Assuming that the throughput corresponding to p % of the entire distribution is pp, the left side of mathematical formula 2 represents $1/k^2$ of the square of the distance from the throughput μavg at the center of the distribution to the throughput pp.

As illustrated in FIG. 4B, if p=99.9%, then k=3.00. If p=97.7%, then k=2.00. If p=95.0%, then k=1.65. If p=90.0%, then k=1.28. If p=84.1%, then k=1.00.

In addition, the calculation unit 4a can obtain the allowable throughput variation σ of the resources E1 to En for achieving the quota t as σ that satisfies the following mathematical formula 3 for the resources E1 to En in the process area $S_1$. The calculation unit 4a may obtain the allowable throughput variation σ of each of the resources E1 to En as the maximum σ that satisfies the following mathematical formula 3.

$$\sigma_i^2 \leq \left( \frac{\sum_{i=1}^{n} \mu_i - t}{k} \right)^2 \cdot \frac{\mu_i^2}{\sum_{i=1}^{n} \mu_i^2} \qquad \text{Mathematical Formula 3}$$

Note that the calculation unit 4a may further determine a threshold throughput based on the number of resources in the process area S and the capability variation characteristic obtained by the evaluation unit 3. The calculation unit 4a can obtain a threshold throughput μt of the process area $S_1$ for achieving the quota t for the process area $S_1$ by the following mathematical formula 4.

$$\mu_t = \sum\nolimits_{i=1}^{n} \mu_i - k\sqrt{\sum\nolimits_{i=1}^{n} \sigma_i^2} \qquad \text{Mathematical Formula 4}$$

As illustrated in FIG. 8, the threshold throughput μt shown in mathematical formula 4 corresponds to the minimum throughput in a case where it is desired to cover p % of the entire throughput from the side on which the throughput is large in the throughput distribution of each of the resources E1 to En in the process area $S_1$.

Figure 9:
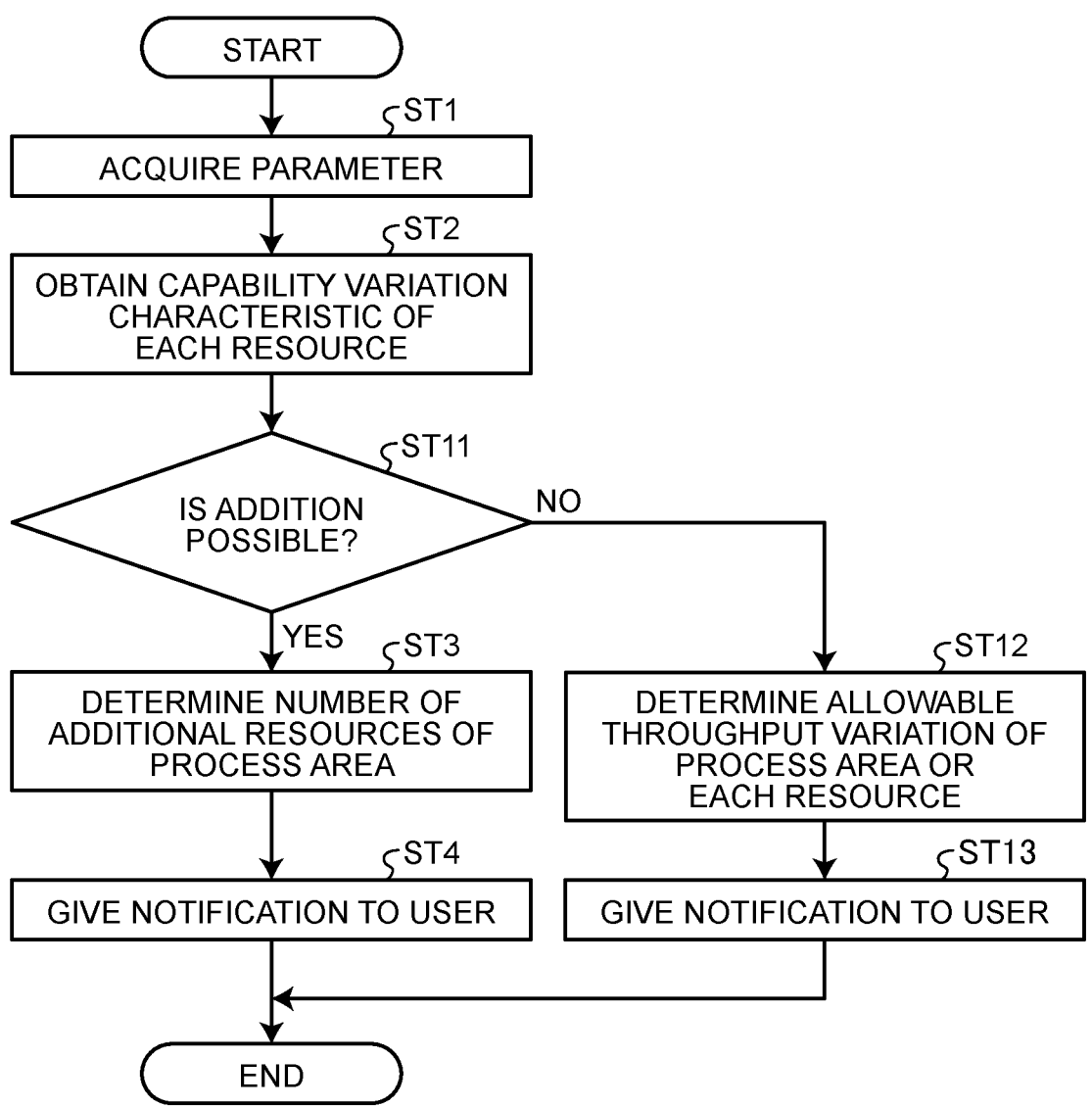
FIG. 9 is a flowchart illustrating an operation of the management system according to the modification of the first embodiment.

In addition, as illustrated in FIG. 9, an operation of the management system 1a is different from that of the first embodiment in the following points. FIG. 9 is a flowchart illustrating the operation of the management system 1a according to the modification of the first embodiment.

After processing similar to ST1 to ST2 described with reference to FIG. 6 is performed in the management system 1a, the control unit 6 determines whether or not a resource can be added (ST11).

For example, the acquisition unit 5 may acquire information indicating that a resource can be added in response to an input from the user or by receiving the information via a communication medium such as a wired communication line or a wireless communication line. When receiving the information indicating that the resource can be added via the acquisition unit 5, the control unit 6 determines that the resource can be added (Yes in ST11) and notifies the calculation unit 4a of the determination result. The calculation unit 4a performs processing of ST3 to ST4.

The acquisition unit 5 may acquire information indicating that a resource cannot be added in response to an input from the user or by receiving the information via the communication medium such as a wired communication line or a wireless communication line. When receiving, via the acquisition unit 5, the information indicating that the resource cannot be added via the acquisition unit 5, the control unit 6 determines that the resource cannot be added (No in ST11) and notifies the calculation unit 4a of the determination result.

In response to the notification indicating that the resource cannot be added, the calculation unit 4a determines the allowable throughput variation of the process area or each of the resources E1 to En for achieving the quota t in the process area S based on the number of resources in the process area S and the capability variation characteristic obtained by the evaluation unit 3 (ST12).

For example, the calculation unit 4a reads the number of resources in each of the process areas $S_1$ to $S_Q$ of the manufacturing line P from the storage unit 2. The calculation unit 4a acquires the capability variation characteristic of each resource E in each of the process areas $S_1$ to $S_Q$ of the manufacturing line P from the evaluation unit 3.

For each of the process areas $S_1$ to $S_Q$, the calculation unit 4a determines the allowable throughput variation $\Sigma\sigma^2$ of the process area S for achieving the quota t in the process area S based on the number of resources in the process area S and the characteristic of the throughput variation of the resources E in the process area S. The calculation unit 4a may obtain the allowable throughput variation $\Sigma\sigma^2$ of the process area S for achieving the quota t in each of the process areas $S_1$ to $S_Q$ by mathematical formula 2. The calculation unit 4a may obtain the allowable throughput variation $\Sigma\sigma^2$ of the process area $S_1$ as the maximum $\Sigma\sigma^2$ that satisfies mathematical formula 2.

For each of the process areas $S_1$ to $S_Q$, the calculation unit 4a determines the allowable throughput variation σ of each of the resources E1 to En for achieving the quota t in the process area S based on the number of resources in the process area S and the characteristics of the throughput variations of the resources E1 to En in the process area S. For each of the process areas $S_1$ to $S_O$, the calculation unit 4a may obtain the allowable throughput variation σ of each of the resources E1 to En for achieving the quota t by mathematical formula 3. The calculation unit 4a may obtain the allowable throughput variation σ of each of the resources E1 to En as the maximum σ that satisfies mathematical formula 3.

The calculation unit 4a supplies the calculation result 2b of the allowable throughput variation $\Sigma\sigma^2$ of each process area S or the allowable throughput variation $\Sigma\sigma^2$ of each resource E to the storage unit 2. The storage unit 2 stores the calculation result 2b of the allowable throughput variation $\Sigma\sigma^2$ of each process area S or the allowable throughput variation σ of each resource E.

The control unit 6 notifies the user of the calculation result 2b of the allowable throughput variation $\Sigma\sigma^2$ of each process area S or the allowable throughput variation σ of each resource E (ST13). For example, the control unit 6 may notify the user of the calculation result 2b of the allowable throughput variation $\Sigma\sigma^2$ of each process area S or the allowable throughput variation σ of each resource E by a visual and/or auditory unit in response to the calculation result 2b being stored into the storage unit 2 or in response to a request from the user or the like.

As described above, in a case where the resource can be added in the management system 1a, for each process area S of the manufacturing line P, the number of additional resources m for achieving the quota t in the process area S is determined based on the number of resources in the process area S and the capability variation characteristic of the process area S. As a result, the number of additional resources m in the process area S can be determined at an appropriate level, the determination result can be notified to the user, and the user can be urged to add resources at an appropriate level.

In addition, in the management system 1a, when the resource cannot be added, the allowable throughput variation $\Sigma\sigma^2$ of the process area S or the allowable throughput variation σ of each resource E in the process area S is determined for each process area S of the manufacturing line P based on the number of resources in the process area S and the capability variation characteristic in the process area S. As a result, it is possible to notify the user of the allowable throughput variation $\Sigma\sigma^2$ in the process area S or the allowable throughput variation σ of each resource E, and it is possible to urge the user to take measures for suppressing the throughput variation such as stopping and maintaining each of the resources E1 to En at regular intervals.

Second Embodiment

Next, a management system 101 according to a second embodiment will be described. Hereinafter, portions different from those of the first embodiment will be mainly described.

In the first embodiment, the number of additional resources in the process area for achieving the quota is obtained, but in the second embodiment, the number of necessary resources of each recipe for achieving the quota is obtained. The recipe corresponds to a combination of a job type and a process area. Here, the type of job is referred to as an item name. The job refers to an object to be processed in the resource E. The item name indicates a type of the object to be processed in the resource E.

Figure 10:
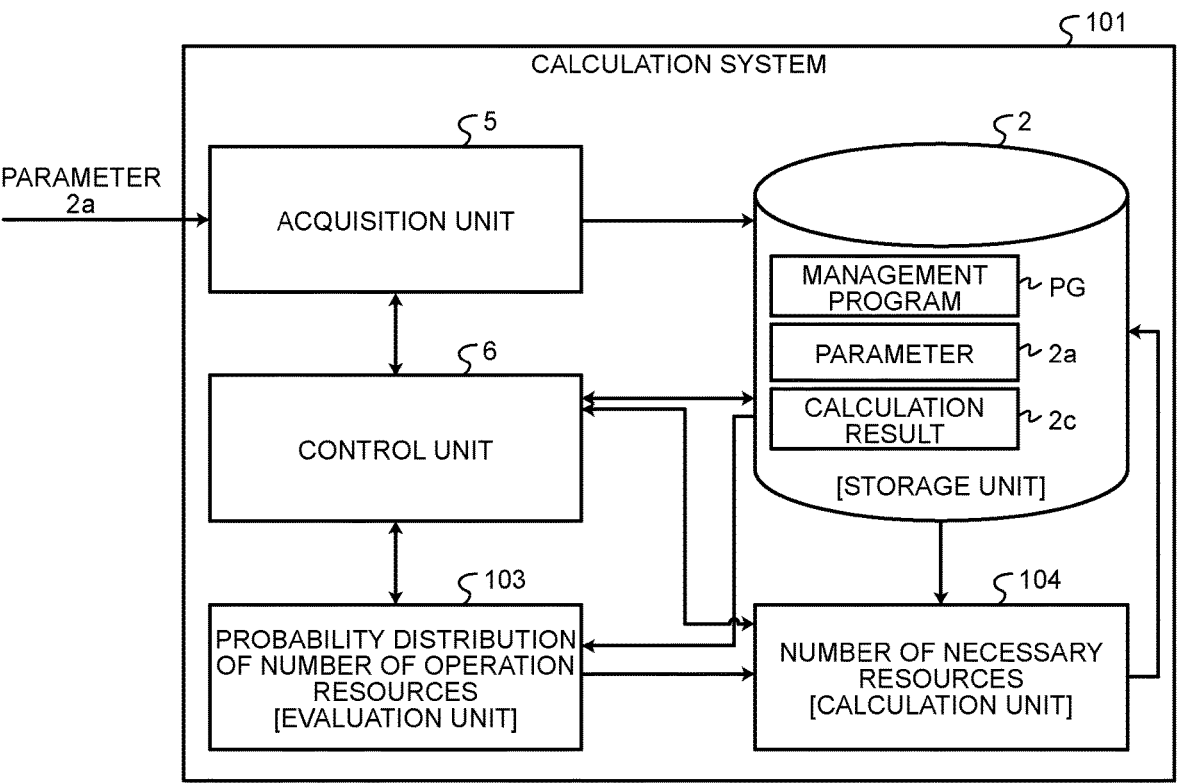
FIG. 10 is a diagram illustrating a functional configuration of a management system according to a second embodiment.

The management system 101 can be configured as illustrated in FIG. 10. FIG. 10 is a diagram illustrating a functional configuration of the management system 101 according to the second embodiment. The management system 101 obtains a probability distribution of the number of resources that can operate in the process area S for the recipe corresponding to the combination of the job type and the process area based on the number of resources in the process area S and the throughput result in the process area S. The management system 101 obtains the number of necessary resources of the recipe for achieving the quota t in the process area S based on the probability distribution of the number of resources that can operate in the process area S.

The management system 101 includes an evaluation unit 103 and a calculation unit 104 as functional configurations instead of the evaluation unit 3 and the calculation unit 4 (refer to FIG. 3).

The storage unit 2 may store quota information of the process area S and quota information of the recipe RP. The quota information of the process area S is the same information as the quota information of the first embodiment. The quota information of the recipe RP is quota information obtained by subdividing the quota information of the first embodiment for each recipe RP. The quota information of the recipe RP is information in which the quota to be achieved, an identifier of the manufacturing line P, an identifier of the process area S, and an identifier of the recipe RP are associated with each other for the multi manufacturing lines P, the multi process areas S, and the multi recipes RP. A quota $t_{RP}$ of the recipe RP is determined in advance corresponding to the quota t of the process area S. When multi recipes RP_1 to PR_r are processed in the process area S, the quota $t_{RP}$ of the recipe RP_1 can be determined so that the sum of the quotas $t_{RP}$ of the multi recipes RP_1 to PR_r is equal to the quota t of the process area S.

The evaluation unit 103 performs evaluation under the control of the control unit 6. The evaluation unit 103 acquires information on the number of resources. The evaluation unit 103 extracts the number of resources in each process area S from the information on the number of resources. The evaluation unit 103 acquires throughput information. The evaluation unit 103 can specify results of the number of resources operated in the process area S for each of the multi recipes RP processed in the manufacturing line P based on the throughput information. The recipe RP includes a combination of a product name and a process.

For each recipe RP, the evaluation unit 103 obtains a probability distribution of the number of resources that can operate in the process area S based on the number of resources in the process area S and the results of the number of resources operated in the process area S. The number of resources that can operate is referred to as the number of operation resources. For a probability distribution of the number of operation resources, the evaluation unit 103 may obtain multi types of probability distributions in which the number of resources to be allocated to each recipe RP is changed.

It is assumed that the multi recipes RP_1 to PR_r are processed in the process area $S_1$. r is an integer of two or more. The evaluation unit 103 can obtain multi probability distributions DS for the recipe RP_1.

Two possible results of the trial of obtaining the probability distribution of the number of operation resources are "operate" and "stop", and can be determined using Bernoulli trial. In this Bernoulli trial, the number of resources allocated to the recipe can be the number of trials. A probability distribution obtained by making a trial of whether the resource "operates" or "stops" by the number of times of the number of resources allocated to the recipe can be obtained as a binomial distribution.

For example, the evaluation unit 103 can obtain the probability distribution of the number of operation resources as a probability distribution obtained by collecting probabilities expressed in the following mathematical formula 5 based on the results of the number of resources operated in the process area S.

$$_vC_jp^j(1-p)^{v-j} \qquad \text{Mathematical Formula 5}$$

In mathematical formula 5, j is the number of operating resources (the number of operation resources).

v is the number of resources to be allocated to the recipe RP_1 in the process area $S_1$. The evaluation unit 103 reads the information on the number of resources from the storage unit 2 and extracts the number of resources n in the process area S from the information on the number of resources. The evaluation unit 103 determines the number of resources v to be allocated to the recipe RP_1 among the number of resources n in the process area S.

v−j is the number of resources to be stopped.

vCj indicates the number of combinations for selecting j from v.

p is a probability of operation. p can take a value of 0 or more and one or less. 1−p is a probability of stopping. $p^j(1-p)^{v-j}$ indicates a probability that j resources E operate and v−j resources E stop. The evaluation unit 103 can acquire the throughput information and specify the results of the number of resources operated in the process area S based on the throughput information. The evaluation unit 103 can obtain the probability $p^j(1-p)^{v-j}$ based on the results of the number of resources operated in the process area S.

After determining the number of resources v to be allocated to the recipe RP_1, the evaluation unit 103 can obtain the probability shown in mathematical formula 5 while changing the number of operation resources j by an integer value from 0 to v, plot the probability for each value of the number of operation resources j, and obtain the probability distribution DS.

The evaluation unit 103 may obtain multi probability distributions DS1 to DS4 as illustrated in FIGS. 11A to 11D while changing the number of resources v to be allocated for the recipe RP_1. FIGS. 11A to 11D are diagrams illustrating probability distributions of the number of resources (the number of operation resources) that can operate for the recipe RP_1. In each of FIGS. 11A to 11D, the vertical axis represents the number of operation resources, and the horizontal axis represents the occurrence probability.

Figures 11A, 11B, 11C, 11D:
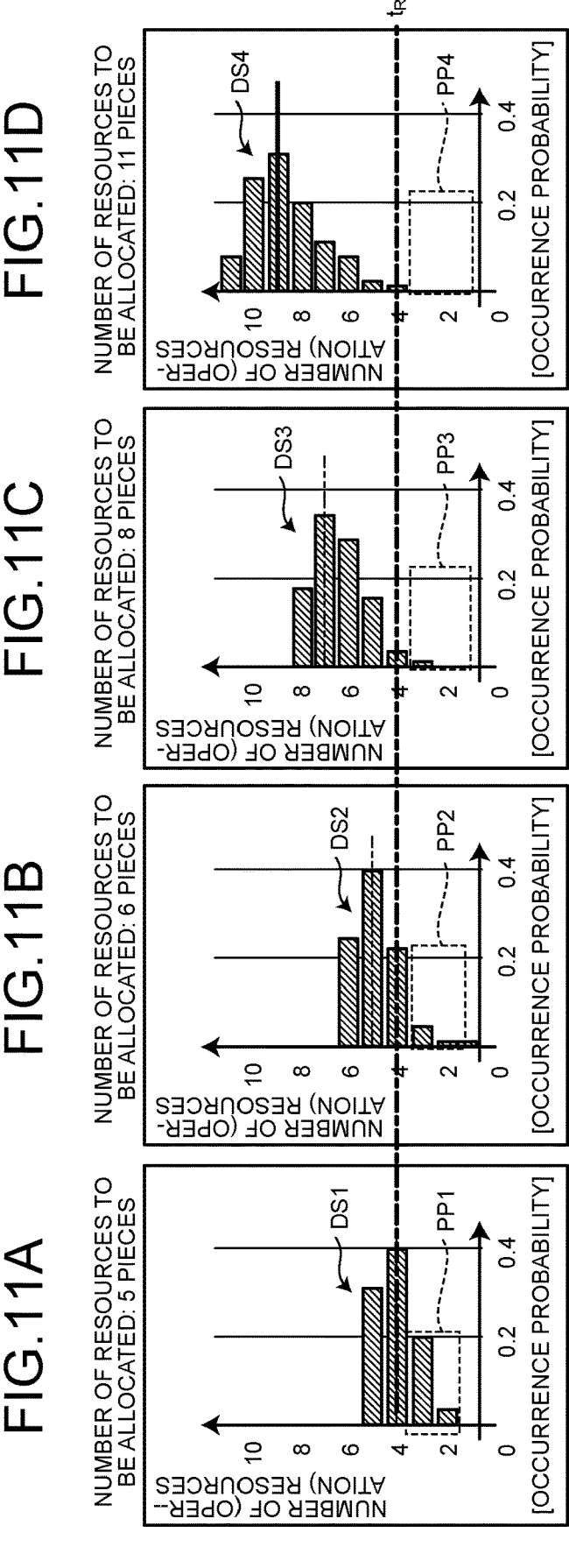
FIGS. 11A to 11D are diagrams illustrating probability distributions of the number of resources that can operate for a recipe according to the second embodiment.

When v=5 (number of resources), the evaluation unit 103 can obtain the probability distribution DS1 based on the results of the number of resources operated in the process area S, as illustrated in FIG. 11A. In the probability distribution DS1, the average value is four, and the probability of five is greater than the probability of three, resulting in a slightly vertically asymmetric distribution.

When v=6 (number of resources), the evaluation unit 103 can obtain the probability distribution DS2 based on the results of the number of resources operated in the process area S, as illustrated in FIG. 11B. In the probability distribution DS2, the average value is five, and the probability of six is greater than the probability of four, resulting in a slightly vertically asymmetric distribution.

When v=8 (number of resources), the evaluation unit 103 can obtain the probability distribution DS3 based on the results of the number of resources operated in the process area S, as illustrated in FIG. 11C. In the probability distribution DS3, the average value is seven, and the probability of eight is smaller than the probability of six, resulting in a slightly vertically asymmetric distribution.

When v=11 (number of resources), the evaluation unit 103 can obtain the probability distribution DS4 based on the results of the number of resources operated in the process area S, as illustrated in FIG. 11D. In the probability distribution DS4, the average value is nine, and the probability of 10 is greater than the probability of eight, resulting in a slightly vertically asymmetric distribution.

The evaluation unit 103 can similarly obtain multi probability distributions DS for the other recipes RP_2 to RP_r processed in the process area $S_1$. The evaluation unit 103 can similarly obtain multi probability distributions DS for multi recipes RP processed in the other process areas $S_2$ to $S_Q$, respectively.

The evaluation unit 103 supplies the multi obtained probability distributions DS to the calculation unit 104 together with the identification information of the process area S and the identification information of the recipe RP.

The calculation unit 104 performs calculation under the control of the control unit 6. The calculation unit 104 obtains the number of necessary resources v of the recipe RP for achieving the quota t in the process area S based on the probability distribution DS obtained by the evaluation unit 103. The calculation unit 104 acquires multi obtained probability distributions DS for each recipe RP from the evaluation unit 103, and reads the quota $t_{RP}$ of the recipe RP from the storage unit 2. The calculation unit 104 obtains the number of necessary resources v of the recipe RP for achieving the quota $t_{RP}$ of the recipe RP based on the multi probability distributions DS. The quota $t_{RP}$ of the recipe RP is a quota of the recipe RP (for example, the recipe RP_1) corresponding to the quota t in the process area S. The calculation unit 104 may select an appropriate probability distribution DS among the multi probability distributions DS, and set the number of resources corresponding to the selected probability distribution DS as the number of necessary resources of the recipe RP. The multi probability distributions DS correspond to different resource numbers. The calculation unit 104 may specify one or more probability distributions DS in which the ratio of a portion smaller than the quota $t_{RP}$ of the recipe RP is smaller than a threshold among the multi probability distributions DS, and select the probability distribution DS having the smallest number of corresponding resources among the specified one or more probability distributions DS as the appropriate probability distribution DS.

For example, for the recipe RP_1 processed in the process area $S_1$, the calculation unit 104 can obtain the number of necessary resources v for achieving the quota $t_{RP}$ as a value so that the cumulative probability that the number of operation resources becomes smaller than the quota $t_{RP}$ is smaller than 100ε% of the whole. For the recipe RP_1, the calculation unit 104 can obtain the number of necessary resources v for achieving the quota $t_{RP}$ as v that satisfies the following mathematical formula 6. The calculation unit 104 may obtain the number of necessary resources v as the minimum integer v that satisfies the following mathematical formula 6.

$$\sum_{f=0}^{t_{RP}-1} {}_vC_jp^j(1-p)^{v-f} < \varepsilon \qquad \text{Mathematical Formula 6}$$

In mathematical formula 6, the portion of $vCjp^{j}(1-p)^{v-j}$ is the same as in mathematical formula 5. The left side of mathematical formula 6 indicates the cumulative probability that the number of operation resources is 0 to $t_{RP}-1$.

ε an error rate indicating a ratio of a range not covered in the entire probability distribution DS. When it is desired to cover q % of the entire probability distribution DS, ε=1−q/100. When q=99(%), ε=0.01.

The calculation unit 104 may determine whether mathematical formula 6 is satisfied for the multi probability distributions DS1 to DS4 of the recipe RP_1 obtained by the evaluation unit 103, and determine the number of necessary resources v of the recipe RP_1 according to the determination result.

For example, ε=0.01. When v=5 (number of resources), the calculation unit 104 calculates a cumulative probability of a portion PP1 surrounded by a dotted line in FIG. 11A. The portion PP1 is a portion where the number of operation resources in the probability distribution DS1 is smaller than the quota $t_{RP}$. The calculation unit 104 compares the cumulative probability of the portion PP1 with E. Since the cumulative probability of the portion PP1 is larger than E, the calculation unit 104 determines that mathematical formula 6 is not satisfied and that the number of resources is insufficient when v=5 (number of resources) to achieve the quota $t_{RP}$.

When v=6 (number of resources), the calculation unit 104 calculates a cumulative probability of a portion PP2 surrounded by a dotted line in FIG. 11B. The portion PP2 is a portion where the number of operation resources in the probability distribution DS2 is smaller than the quota $t_{RP}$. The calculation unit 104 compares the cumulative probability of the portion PP2 with E. Since the cumulative probability of the portion PP2 is larger than E, the calculation unit 104 determines that mathematical formula 6 is not satisfied and that the number of resources is insufficient when v=6 (number of resources) to achieve the quota $t_{RP}$.

When v=8 (number of resources), the calculation unit 104 calculates a cumulative probability of a portion PP3 surrounded by a dotted line in FIG. 11C. The portion PP3 is a portion where the number of operation resources in the probability distribution DS3 is smaller than the quota t R p. The calculation unit 104 compares the cumulative probability of the portion PP3 with E. Since the cumulative probability of the portion PP3 is smaller than E, the calculation unit 104 determines that mathematical formula 6 is satisfied and that the number of resources v=8 (number of resources) is sufficient to achieve the quota $t_{RP}$.

When v=11 (number of resources), the calculation unit 104 calculates the cumulative probability of a portion PP4 surrounded by the dotted line in FIG. 11D. The portion PP4 is a portion where the number of operation resources in the probability distribution DS4 is smaller than the quota $t_{RP}$. The calculation unit 104 compares the cumulative probability of the portion PP4 with E. Since the cumulative probability of the portion PP4 is smaller than E, the calculation unit 104 determines that mathematical formula 6 is satisfied. Here, since mathematical formula 6 is already satisfied when v=8 (number of resources), the calculation unit 104 determines that the number of resources is excessive when v=11 (number of resources) to achieve the quota $t_{RP}$.

In the case of FIGS. 11A to 11D, the calculation unit 104 determines the number of necessary resources for the recipe RP_1 for achieving the quota $t_{RP}$ as v=8 (number of resources).

Similarly, for the other recipes RP_2 to RP_r in the process area $S_1$, the calculation unit 104 obtains the number of necessary resources v for each of the recipes RP_2 to RP_r for achieving the quota $t_{RP}$ by mathematical formula 6. The calculation unit 104 also obtains the number of necessary resources v of the recipes RP_2 to RP_r for achieving the quota $t_{RP}$ for each recipe RP in the process areas $S_2$ to $S_Q$ by mathematical formula 6. The calculation unit 104 supplies a calculation result 2c of the number of necessary resources v of each recipe RP to the storage unit 2.

Figure 12:
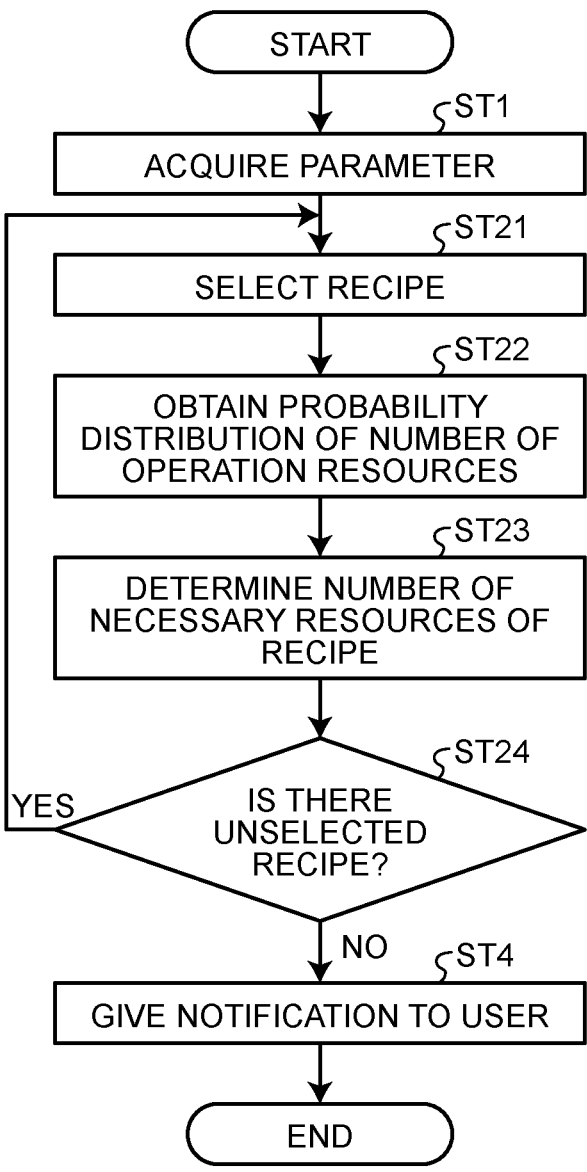
FIG. 12 is a flowchart illustrating an operation of the management system according to the second embodiment.

In addition, as illustrated in FIG. 12, an operation of the management system 101 is different from that of the first embodiment in the following points. FIG. 12 is a flowchart illustrating the operation of the management system 101 according to the second embodiment. FIG. 12 exemplifies an operation for one process area S ($S_1$ in this case), but the same applies to the operations for the other process areas S.

After the processing of ST1 described with reference to FIG. 6 is performed in the management system 101, the control unit 6 selects the recipe RP to be processed (here, the recipe RP_1) among the multi recipes RP_1 to PR_r in the process area $S_1$ (ST21). The control unit 6 notifies the evaluation unit 103 and the calculation unit 104 of the selected recipe RP to be processed.

The evaluation unit 103 obtains a probability distribution of the number of resources that can operate in the process area $S_1$ based on the number of resources in the process area $S_1$ and the results of the number of resources operated in the process area $S_1$ for the recipe RP_1 to be processed (ST22).

For example, the evaluation unit 103 reads the information on the number of resources from the storage unit 2 and extracts the number of resources n in the process area $S_1$ from the information on the number of resources. The evaluation unit 103 determines the number of resources v to be allocated to the recipe RP_1 among the number of resources n in the process area $S_1$. After determining the number of resources v to be allocated to the recipe RP_1, the evaluation unit 103 can obtain the probability shown in mathematical formula 5 while changing the number of operation resources j by an integer value from 0 to v, plot the probability for each value of the number of operation resources j, and obtain the probability distribution. At this time, the evaluation unit 103 can obtain multi probability distributions DS, as illustrated in FIGS. 11A to 11D, while changing the number of resources v to be allocated for the recipe RP_1.

Based on the probability distribution DS obtained in ST22, the calculation unit 104 obtains the number of necessary resources v for the recipe for achieving the quota t in the process area $S_1$ (ST23).

For example, the calculation unit 104 acquires the multi obtained probability distributions DS for the recipe RP to be processed from the evaluation unit 103. The calculation unit 104 obtains the number of necessary resources v of the recipe RP_1 for achieving the quota $t_{RP}$ of the recipe RP_1 based on the multi probability distributions DS. The quota $t_{RP}$ of the recipe RP_1 is a quota of the recipe RP_1 corresponding to the quota t in the process area $S_1$.

For the recipe RP_1, the calculation unit 104 can obtain the number of necessary resources v for achieving the quota $t_{RP}$ as v that satisfies mathematical formula 6. The calculation unit 104 may obtain the number of necessary resources v as the minimum integer v that satisfies mathematical formula 6.

The calculation unit 104 supplies the calculation result 2c of the number of necessary resources v of the recipe RP_1 to the storage unit 2. The storage unit 2 stores the calculation result 2c of the number of necessary resources v of the recipe RP_1.

The control unit 6 determines whether or not there is an unselected recipe RP among the multi recipes RP_1 to PR_r (ST24). If there is an unselected recipe RP (Yes in ST24), the control unit 6 selects the unselected recipe RP and returns the processing to ST21. If there is no unselected recipe RP (No in ST24), the control unit 6 notifies the user of the calculation result 2c of the number of necessary resources v of each recipe RP in the process area $S_1$ (ST4).

As described above, in the second embodiment, the number of necessary resources v of each recipe for achieving the quota t in the process area S is obtained for each of the multi recipes RP processed in each process area S of the manufacturing line P. For each recipe RP, the probability distribution of the number of operation resources is obtained, and the number of necessary resources v of the recipe RP for achieving the quota $t_{RP}$ of the recipe RP is obtained based on the probability distribution of the number of operation resources. As a result, the number of necessary resources v of each recipe RP to be processed in the process area S can be determined at an appropriate level, the determination can be notified to a user, and the user can be urged to allocate the number of necessary resources to each recipe RP at an appropriate level.

Third Embodiment

Next, a management system 201 according to a third embodiment will be described. Hereinafter, portions different from those of the first embodiment and the second embodiment will be mainly described.

In the second embodiment, the number of necessary resources for achieving the quota is obtained for each recipe, but in the third embodiment, the total processing capability of each resource E is weighted according to the number of necessary resources and distributed for each recipe.

Figure 13:
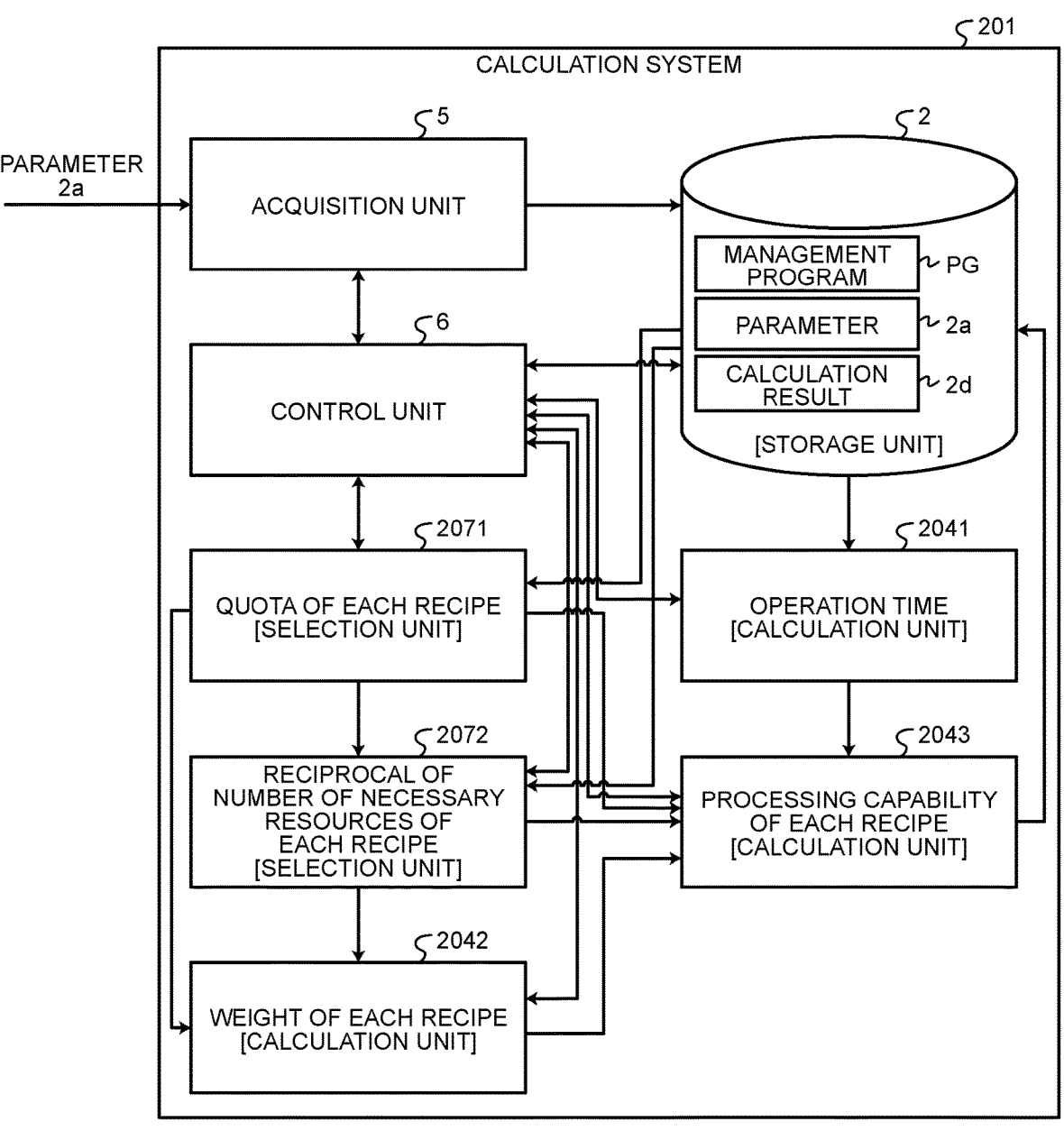
FIG. 13 is a diagram illustrating a functional configuration of a management system according to a third embodiment.

The management system 201 can be configured as illustrated in FIG. 13. FIG. 13 is a diagram illustrating a functional configuration of the management system 201 according to the third embodiment. The management system 201 obtains a weight of each recipe RP according to the number of necessary resources v of each recipe RP in each process area S. The management system 201 distributes the total processing capability of each resource E to the recipe RP according to the weight of each recipe RP.

The management system 201 includes, as a functional configuration, calculation units 2041, 2042, and 2043 instead of the calculation unit 4 (refer to FIG. 3), and further includes selection units 2071 and 2072.

The storage unit 2 may store quota information of the process area S and quota information of the recipe RP. The quota information of the process area S is the same information as the quota information of the first embodiment. The quota information of the recipe RP is the same information as the quota information of the recipe RP in the second embodiment. In addition, the storage unit 2 stores a calculation result 2d including the number of necessary resources v of each of the multi recipes RP processed in the multi process areas S and the processing capability of each recipe RP obtained by the calculation unit 2043.

The calculation unit 2041 performs calculation under the control of the control unit 6. The calculation unit 2041 reads a throughput result of each resource E in the process area S from the storage unit 2. The calculation unit 2041 obtains the rate of operation of each resource E based on the throughput result of each resource E. The rate of operation of the resource E is a rate of the operation time of the resource E in the unit time. The operation time of the resource E is a time during which the resource E operates. When the resource E operates in the operation time of 80% in the unit time, the rate of operation is 0.80. The unit time may be the same as the unit time mentioned in the first embodiment, or may be 1 day=1440 (min). The calculation unit 2041 may obtain the operation time of each resource E by the following mathematical formula 7.

[Operation Time]=[Unit Time]×[Rate of Operation]  Mathematical Formula 7

For example, as illustrated in FIG. 14, it is assumed that the rates of operation of the resources E1 to E5 are all 0.80. FIG. 14 is a diagram illustrating an operation of the management system 201 in the third embodiment. In this case, the calculation unit 2041 obtains the operation time of each of the resources E1 to E5 as 1440 (min)×0.80=1152 (min).

The calculation unit 2041 illustrated in FIG. 13 supplies the obtained operation time of each resource E to the calculation unit 2043.

The selection unit 2071 performs selection processing under the control of the control unit 6. The selection unit 2071 reads the quota information of the recipe RP from the storage unit 2. The selection unit 2071 extracts the quota $t_{RP}$ of the multi recipes RP_1 to RP_r processed in the process area S from the quota information of the recipe RP. The selection unit 2071 supplies the quota $t_{RP}$ of each of the recipes RP_1 to RP_r to the calculation unit 2042.

The selection unit 2072 performs selection processing under the control of the control unit 6. The selection unit 2072 reads the calculation result 2d of the number of necessary resources v of each of the multi recipes RP processed in the process area S from the storage unit 2. The selection unit 2072 obtains a reciprocal 1/v of the number of necessary resources of each recipe RP according to the calculation result 2d.

For example, in the case illustrated in FIG. 14, the number of necessary resources of the recipes RP_1, RP_2, and RP_3 are 5, 4, and 5, the recipes RP_1 and RP_3 are processed by the resources E1 to E5, and the recipe RP_2 is processed by the resources E1 to E4. The selection unit 2072 obtains the reciprocals 1/v of the number of necessary resources of the recipes RP_1, RP_2, and RP_3 as 0.20, 0.25, and 0.20, respectively.

The selection unit 2072 illustrated in FIG. 13 supplies the reciprocal 1/v of the number of necessary resources of each recipe RP to the calculation unit 2042.

The calculation unit 2042 obtains the weight of each recipe RP according to the reciprocal 1/v of the number of necessary resources of each recipe RP in each process area S. The calculation unit 2042 acquires the quota $t_{RP}$ of each of the recipes RP_1 to RP_r from the selection unit 2071, and acquires the reciprocal 1/v of the number of necessary resources of each recipe RP from the selection unit 2072.

The calculation unit 2042 may obtain the weight of each recipe RP so that the throughput is equalized among the multi recipes RP_1 to RP_r according to the reciprocal 1/v of the number of necessary resources of each recipe RP. The calculation unit 2042 may obtain the weight based on the concept of harmonic average. For each process area S, the calculation unit 2042 may obtain a weight in accordance with the ratio of the reciprocal 1/v of the number of necessary resources of the recipe RP to the sum of the reciprocals 1/v of the number of necessary resources of the multi recipes RP_1 to RP_r.

The calculation unit 2042 may select a recipe of interest RP (for example, the recipe RP_1) from the multi recipes RP_1 to RP_r and obtain a weight of the recipe of interest RP by the following mathematical formula 8.

$$\text{[Weight of Recipe } RP] = \frac{\begin{array}{c}\text{[Quota } t_{RP} \text{ of Recipe } RP]\times\text{[pitch]}\div\\ \text{[Number of MAX charges]}\times\\ \text{[Reciprocal of Number of}\\ \text{Necessary Resources of Recipe } RP]\end{array}}{\sum_{i=1}^{r}\begin{array}{c}\text{[Quota } t_{RP\_1} \text{ of Recipe } RP\_i]\times\\ \text{[pitch]}\div\text{[Number of MAX charges]}\times\\ \text{[Reciprocal of Number of Necessary}\\ \text{Resources of Recipe } RP\_i]\end{array}}$$

Mathematical Formula 8

In mathematical formula 8, [picth] is a processing speed per unit amount (for example, one substrate) of the job by the resource E. [Number of MAX charges] is the amount of jobs (for example, the number of substrates that can be processed in parallel) that can be processed in parallel by the resource E. When [picth] (time/number) is multiplied to the quota (number) and divided by [number of MAX charges] (parallel processing number), the quota can be converted into time.

The numerator on the right side of mathematical formula 8 represents the product of the time converted from the quota and the reciprocal 1/v of the number of necessary resources, and the smaller the number of necessary resources v, the larger the value. The denominator on the right side of mathematical formula 8 represents the sum obtained by adding the product of the time converted from the quota and the reciprocal 1/v of the number of necessary resources with respect to the multi recipes RP_1 to RP_r. The right side of mathematical formula 8 represents a weight that increases as the number of necessary resources v for the recipe RP decreases.

For example, attention is paid to the resource E1 illustrated in FIG. 14. Assuming that the number of MAX charges=1, the quota $t_{RP}$ of each of the recipes RP_1 to RP_3 is 69, and the picthes of the recipes RP_1, RP_2, and RP_3 are 20, 30, and 24. reciprocals 1/v of the number of necessary resources of the recipes RP_1, RP_2, and RP_3 are 0.20, 0.25, and 0.20. The calculation unit 2042 obtains the weights of the recipes RP_1 to RP_3 as follows by mathematical formula 8.

Weight of the recipe $RP\_1$=(69×20÷1×0.20)/(69× 20÷1×0.20+69×30÷1×0.25+69×24÷1×0.20) ≈0.26

Weight of recipe $RP\_2$=(69×30÷1×0.25)/(69×20÷1× 0.20+69×30÷1×0.25+69×24÷1×0.20)≈0.48

Weight of recipe $RP\_3$=(69×20÷1×0.20)/(69×20÷1× 0.20+69×30÷1×0.25+69×24÷1×0.20)≈0.26

When the weights of the recipes RP_1 to RP_3 are compared, the weight of the recipe RP_2 having a small number of necessary resources (four) is larger than the weight of the recipes RP_1 and RP_3 having a large number of necessary resources (five).

The calculation unit 2042 can also obtain the weights of the recipes RP_1 to RP_3 for the other resources E2 to E5 by mathematical formula 8.

Similarly, the calculation unit 2042 illustrated in FIG. 13 may obtain the weight of another recipe RP by mathematical formula 8. The calculation unit 2042 supplies the weight of each recipe RP in the process area S to the calculation unit 2043.

The calculation unit 2043 performs calculation under the control of the control unit 6. The calculation unit 2043 may distribute the total processing capability of each resource E to each recipe RP according to the weight of each recipe RP and obtain the processing capability of each recipe RP.

Here, the total processing capability of each resource E corresponds to the operation time of each resource E. The calculation unit 2043 distributes the operation time of each resource E as a processing time in accordance with the weight of the multi recipes RP processed in each resource E, and converts the distributed processing time into the processing capability. As a result, the calculation unit 2043 can distribute the total processing capability of each resource E to each recipe RP according to the weight of each recipe RP.

The calculation unit 2043 acquires the operation time of each resource E from the calculation unit 2041. The calculation unit 2043 acquires the weight of each recipe RP from the calculation unit 2042. The calculation unit 2043 obtains the processing time of the recipe RP using the operation time of the resource E and the weight of the recipe RP.

The calculation unit 2043 may select the recipe of interest RP (for example, the recipe RP_1) among the multi recipes RP_1 to RP_r and obtain the processing time of the recipe of interest RP by the following mathematical formula 9.

[Processing Time] of Recipe $RP$=[Operation Time]× [Weight of Recipe $RP$]    Mathematical Formula 9

The right side of mathematical formula 9 represents that operation time of the resource E is distributed as the processing time of the recipe RP according to the weight of the recipe RP.

For example, attention is paid to the resource E1 illustrated in FIG. 14. The calculation unit 2043 obtains the processing times of the recipes RP_1 to RP_3 as follows by mathematical formula 9.

Processing time of the recipe $RP\_1$=1152(min)× 0.26≈299(min)

Processing time of the recipe $RP\_2$=1152(min)× 0.48≈553(min)

Processing time of the recipe $RP\_3$=1152(min)× 0.26≈299(min)

The calculation unit 2043 can also obtain the processing times of the recipes RP_1 to RP_3 for the other resources E2 to E5 by mathematical formula 9.

The calculation unit 2043 illustrated in FIG. 13 converts the processing time of the recipe RP into the processing capability of the recipe RP.

The calculation unit 2043 may select the recipe of interest RP (for example, the recipe RP_1) among the multi recipes RP_1 to RP_r and convert the processing time of the recipe of interest RP into the processing capability of the recipe RP by the following mathematical formula 10.

Mathematical Formula 10

$$\text{[Processing Capability] of Recipe } RP =$$
$$\text{[Processing Time]}\times\frac{1}{\text{[pitch]}\div\text{[Number of MAX charges]}}$$

The right side of mathematical formula 10 represents that the processing time of the recipe RP may be converted into the processing capability of the recipe RP by dividing the processing time of the recipe RP by the processing speed of the resource E.

For example, attention is paid to the resource E1 illustrated in FIG. 14. When the number of MAX charges is 1, picthes of the recipes RP_1, RP_2, and RP_3 are 20, 30, and 24, respectively. The calculation unit 2043 converts the processing time of the recipes RP_1 to RP_3 into the processing capability of the recipe RP as follows by mathematical formula 10.

Processing capability of the recipe $RP\_1=299\div(20\div1)\approx15.0$

Processing capability of the recipe $RP\_2=553\div(30\div1)\approx18.4$

Processing capability of the recipe $RP\_1=299\div(24\div1)\approx12.4$

The calculation unit 2043 can also convert the processing time of the recipes RP_1 to RP_3 into the processing capability of the recipe RP by mathematical formula 10 for the other resources E2 to E5.

A value obtained by summing the processing capability of each recipe RP for the multi resources E1 to E5 will be referred to as a processing capability meter. The processing capability meters of the recipes RP_1 to RP_3 are 88.8, 73.6, and 73.6, respectively. When the processing capability meter÷the quota is referred to as a quota achievement rate, the quota achievement rates of the recipes RP_1 to RP_3 are 1.28, 1.06, and 1.06, respectively. It is confirmed that the achievement rate of each of the recipes RP_1 to RP_3 is larger than 1 and the quota has been achieved.

Similarly, the calculation unit 2043 may convert the processing time of another recipe RP into the processing capability of the recipe RP by mathematical formula 10. The calculation unit 2043 supplies the calculation result 2d of the processing capability of each recipe RP to the storage unit 2.

Figure 15:
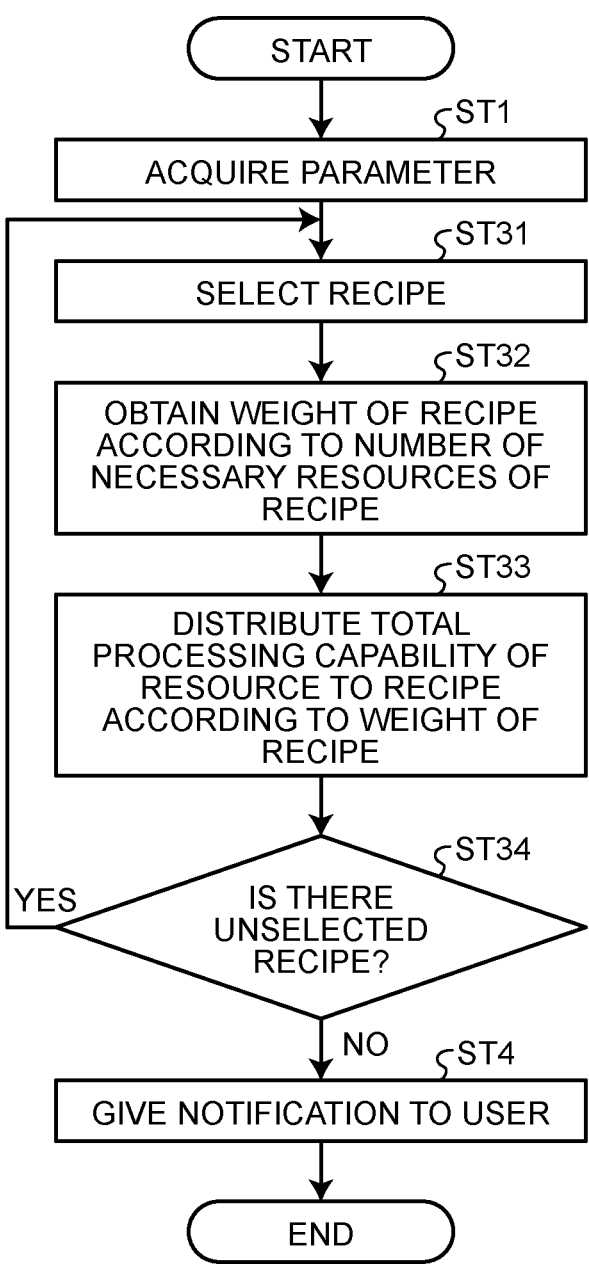
FIG. 15 is a flowchart illustrating an operation of the management system according to the third embodiment.

In addition, as illustrated in FIG. 15, the operation of the management system 201 is different from that of the first embodiment in the following points. FIG. 15 is a flowchart illustrating the operation of the management system 201 in the third embodiment. FIG. 15 exemplifies an operation for one process area S ($S_1$ in this case), but the same applies to the operations for the other process areas S.

After the processing of ST1 described with reference to FIG. 6 is performed in the management system 201, the control unit 6 selects the recipe RP to be processed (here, the recipe RP_1) among the multi recipes RP_1 to PR_r in the process area $S_1$ (ST31). The control unit 6 notifies the selection units 2071 and 2072 and the calculation units 2041, 2042, and 2043 of the selected recipe RP_1 to be processed.

The selection units 2071 and 2072 and the calculation unit 2042 obtain a weight of the recipe RP_1 to be processed according to the number of necessary resources v of the recipe RP_1 to be processed (ST32).

The selection unit 2071 reads the quota information of the recipe RP from the storage unit 2. The selection unit 2071 extracts the quota $t_{RP}$ of the multi recipes RP_1 to RP_r processed in the process area $S_1$ from the quota information of the recipe RP. The selection unit 2071 supplies the quota $t_{RP}$ of each recipe RP to the calculation unit 2042.

The selection unit 2072 reads the calculation result 2d of the number of necessary resources v of each of the multi recipes RP_1 to RP_r processed in the process area $S_1$ from the storage unit 2. The selection unit 2072 obtains a reciprocal 1/v of the number of necessary resources of each recipe RP according to the calculation result 2d. The selection unit 2072 supplies the reciprocal 1/v of the number of necessary resources of each recipe RP to the calculation unit 2042.

The calculation unit 2042 acquires the reciprocal 1/v of the number of necessary resources of each recipe RP from the selection unit 2072.

The calculation unit 2042 may obtain the weight of each recipe RP so that the throughput is equalized among the multi recipes RP_1 to RP_r according to the reciprocal 1/v of the number of necessary resources of each recipe RP. The calculation unit 2042 may obtain the weight based on the concept of harmonic average. For each process area S, the calculation unit 2042 may obtain a weight in accordance with the ratio of the reciprocal 1/v of the number of necessary resources of the recipe RP_1 to be processed to the sum of the reciprocals 1/v of the number of necessary resources of the multi recipes RP_1 to RP_r. The calculation unit 2042 may obtain the weight of the recipe RP_1 by mathematical formula 8.

The calculation unit 2042 supplies the weight of the recipe RP_1 to be processed in the process area $S_1$ to the calculation unit 2043.

The calculation units 2041 and 2043 distribute the total processing capability of the resource E to the recipe RP_1 to be processed according to the weight of each recipe RP (ST33).

The calculation unit 2041 reads the throughput result of each resource E in the process area $S_1$ from the storage unit 2. The calculation unit 2041 obtains the rate of operation of each resource E based on the throughput result of each resource E. The rate of operation of the resource E is a ratio of an operation time of the resource E in a unit time (for example, one day). The operation time of the resource E is a time during which the resource E operates. The calculation unit 2041 may obtain the operation time of each resource E by mathematical formula 7.

The calculation unit 2041 supplies the obtained operation time of each resource E to the calculation unit 2043.

The calculation unit 2043 acquires the operation time of each resource E from the calculation unit 2041. The calculation unit 2043 acquires the weight of the recipe RP_1 from the calculation unit 2042. The calculation unit 2043 obtains the processing time of the recipe RP_1 using the operation time of the resource E, the ratio of the quota $t_{RP}$ of the recipe RP_1, and the weight of the recipe RP_1. The calculation unit 2043 may obtain the processing time of the recipe RP by mathematical formula 9.

The calculation unit 2043 converts the processing time of the recipe RP_1 into the processing capability of the recipe RP_1. The calculation unit 2043 may convert the processing time of the recipe RP_1 into the processing capability of the recipe RP_1 by mathematical formula 10.

The calculation unit 2043 supplies the calculation result 2d of the processing capability of the recipe RP_1 to the storage unit 2. The storage unit 2 stores the calculation result 2d of the processing capability of the recipe RP_1.

The control unit 6 determines whether there is an unselected recipe RP among the multi recipes RP_1 to PR_r (ST34). If there is an unselected recipe RP (Yes in ST34), the control unit 6 selects the unselected recipe RP and returns the processing to ST31. If there is no unselected recipe RP (No in ST34), the control unit 6 notifies the user of the calculation result 2d of the processing capability of each recipe RP (ST4).

As described above, in the third embodiment, the total processing capability of each resource E is weighted according to the number of necessary resources and distributed for each recipe RP. For example, a weight in accordance with the ratio of the reciprocal 1/v of the number of necessary resources of the target recipe RP to the sum of the reciprocals 1/v of the number of necessary resources of the multi recipes RP_1 to RP_r may be obtained. As a result, the throughput can be equalized among the multi recipes RP_1 to RP_r, and the total processing capability of each resource E can be efficiently distributed to the multi recipes RP while operating each resource E as much as possible. As a result, in the manufacturing line P, the robustness can be improved while achieving the quota t.

For example, when the total processing capability of the multi resources E is distributed to the multi recipes RP, it may be conceivable to perform allocation so as to shorten the total processing time as much as possible. In this case, the processing tends to be performed in a short time by concentrating the processing on the specific resource E for each recipe RP. Therefore, the processing of each recipe RP is biased to the specific resource E, the number of resources E to be stopped increases, or the stop time of the resource E becomes long. As a result, the robustness of the manufacturing line P may be reduced. That is, when some of the resources E in the multi resources E of the manufacturing line P are stopped due to a trouble or the like, the throughput of the manufacturing line P may be significantly reduced.

On the other hand, in the third embodiment, the throughput can be equalized among the multi recipes RP_1 to RP_r, and the total processing capability of each resource E can be efficiently distributed to each recipe RP while operating each resource E as much as possible. As a result, in the manufacturing line P, the number of resources E to be stopped can be suppressed, and the stop time of each resource E can be shortened. Therefore, the robustness of the manufacturing line P can be improved while achieving the quota t.

Figure 16:
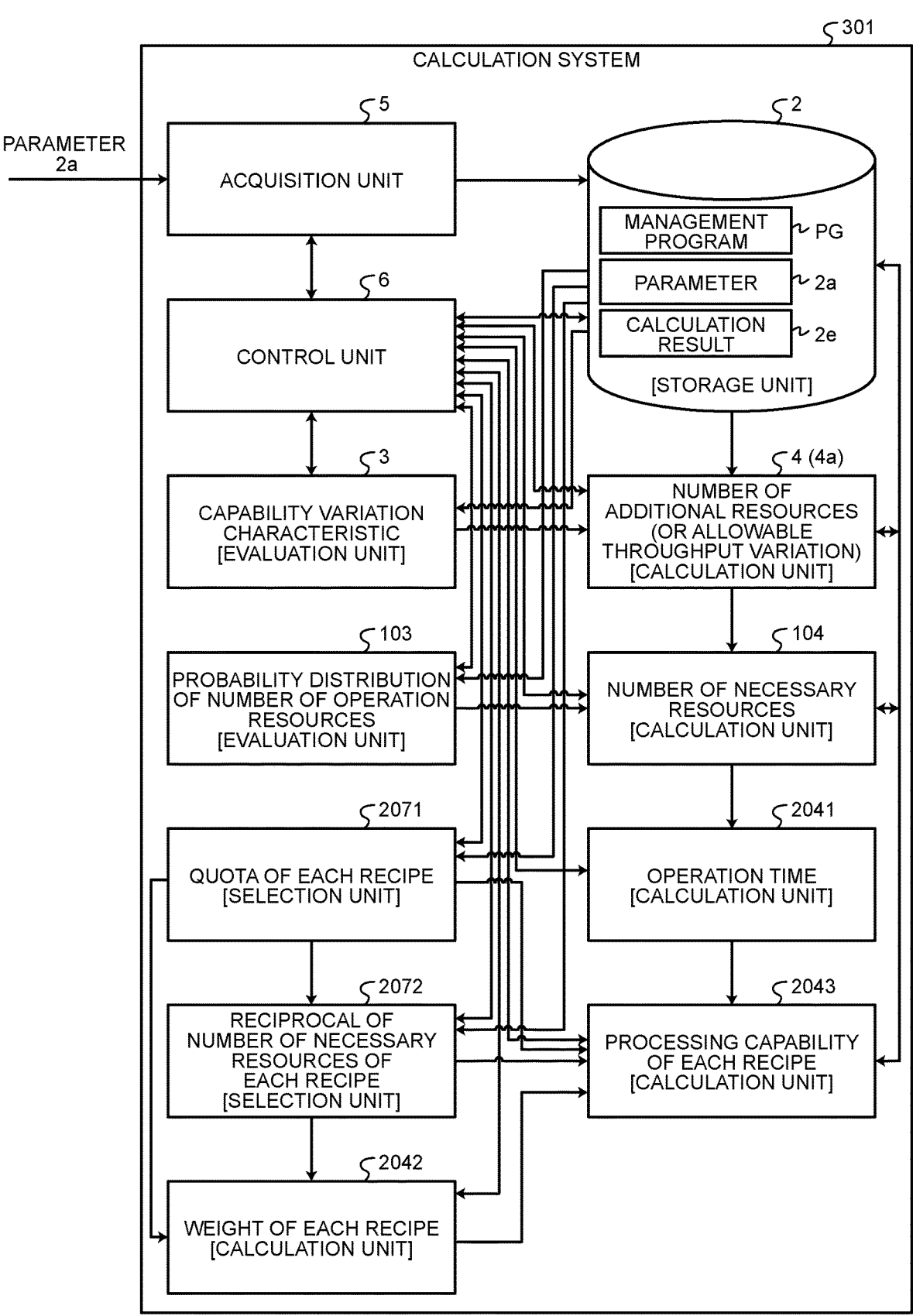
FIG. 16 is a diagram illustrating a functional configuration of a management system in which the first to third embodiments are combined.

It is noted that, as illustrated in FIG. 16, a management system 301 in which the first to third embodiments are combined may be constructed. FIG. 16 is a diagram illustrating a functional configuration of the management system 301 in which the first to third embodiments are combined.

The management system 301 includes, as functional configurations, a control unit 6, an acquisition unit 5, a storage unit 2, an evaluation unit 3, a calculation unit 4 (or a calculation unit 4a), an evaluation unit 103, a calculation unit 104, calculation units 2041, 2042, and 2043, and selection units 2071 and 2072.

The configuration and operation of the control unit 6 are obtained by merging the configuration and operation of the control unit 6 in the first embodiment, the configuration and operation of the control unit 6 in the second embodiment, and the configuration and operation of the control unit 6 in the third embodiment.

The configuration and operation of the acquisition unit 5 are obtained by merging the configuration and operation of the acquisition unit 5 in the first embodiment, the configuration and operation of the acquisition unit 5 in the second embodiment, and the configuration and operation of the acquisition unit 5 in the third embodiment.

The configuration and operation of the storage unit 2 are obtained by merging the configuration and operation of the storage unit 2 in the first embodiment, the configuration and operation of the storage unit 2 in the second embodiment, and the configuration and operation of the storage unit 2 in the third embodiment. A calculation result 2e stored in the storage unit 2 is obtained by merging the calculation result 2a of the first embodiment, the calculation result 2b of the first embodiment, and the calculation result 2c of the third embodiment.

The configuration and operation of the evaluation unit 3 are similar to the configuration and operation of the evaluation unit 3 in the first embodiment.

The configuration and operation of the calculation unit 4 are similar to the configuration and operation of the calculation unit 4 in the first embodiment. The calculation unit 4 may be replaced with the calculation unit 4a in the modification of the first embodiment. The configuration and operation of the calculation unit 4a are similar to the configuration and operation of the calculation unit 4a in the modification of the first embodiment.

The configuration and operation of the evaluation unit 103 are similar to the configuration and operation of the evaluation unit 103 in the second embodiment.

The configuration and operation of the calculation unit 104 are similar to the configuration and operation of the calculation unit 104 in the second embodiment.

The configuration and operation of the calculation unit 2041 are similar to the configuration and operation of the calculation unit 2041 in the third embodiment.

The configuration and operation of the calculation unit 2042 are similar to the configuration and operation of the calculation unit 2042 in the third embodiment.

The configuration and operation of the calculation unit 2043 are similar to the configuration and operation of the calculation unit 2043 in the third embodiment.

The configuration and operation of the selection unit 2071 are similar to the configuration and operation of the selection unit 2071 in the third embodiment.

The configuration and operation of the selection unit 2072 are similar to the configuration and operation of the selection unit 2072 in the third embodiment.

Such a management system 301 can also determine the number of additional resources m in the process area S at an appropriate level, notify the user of the determination result, and urge the user to add the resource E at an appropriate level. Therefore, the number of resources for achieving the quota t can be secured for each manufacturing line P.

By such a management system 301 as well, the number of necessary resources v of each recipe RP to be processed in the process area S can be determined at an appropriate level, this determination result can be notified to the user, and the user can be urged to allocate the number of necessary resources to each recipe RP at an appropriate level.

By such a management system 301 as well, the throughput can be equalized among the multi recipes RP_1 to RP_r, and the total processing capability of each resource E can be efficiently distributed to the multi recipes RP while operating each resource E as much as possible. As a result, in the manufacturing line P, the robustness can be improved while achieving the quota t.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of managing a manufacturing line, the method comprising:

obtaining a capability variation characteristic of each resource based on a throughput result of a process area among multi process areas arranged in the manufacturing line, each of the process areas including a multi resources, the capability variation characteristic being obtained by statistically analyzing distribution of a throughput result over time in a predetermined period; and

determining number of additional resources for achievement of a quota in the process area based on the number of resources in the process area and the obtained capability variation characteristic.

2. The method of managing the manufacturing line according to claim 1, further comprising notifying the determined number of additional resources by a visual and/or auditory unit.

3. The method of managing the manufacturing line according to claim 1, wherein the obtaining the capability variation characteristic includes:

obtaining a probability distribution of a throughput of each resource; and obtaining a parameter indicating a characteristic of the probability distribution.

4. The method of managing the manufacturing line according to claim 3, wherein the determining the number of additional resources includes obtaining, when p is set to a number greater than 0 and equal to or smaller than 100, a number as the number of additional resources, the number being obtained by subtracting a current number of resources from the number of resources in which a boundary corresponding to p % of the entire probability distribution is equal to or greater than the quota in the process area.

5. The method of managing the manufacturing line according to claim 4, wherein the determining the number of additional resources includes obtaining, by the number of additional resources m, m satisfying $$\sum_{i=1}^{n+m} \mu_i - k\sqrt{\sum_{i=1}^{n+m} \sigma_i^2} \geq t$$

where an identifier of a resource E is set to i, average throughput of a resource Ei is set to μi, a standard deviation of the resource Ei is set to σi, the current number of resources is set to n, a coefficient corresponding to p is set to k, and the quota in the process area is set to t.

6. The method of managing the manufacturing line according to claim 1, wherein the determining the number of additional resources includes determining, when the resource is addible, the number of additional resources in the process area for the achievement of the quota in the process area based on the number of resources in the process area and the obtained capability variation characteristic, the method further comprising determining, when the resource is not addible, an allowable throughput variation of the process area or each resource for the achievement of the quota in the process area based on the number of resources in the process area.

7. The method of managing the manufacturing line according to claim 6, further comprising:

notifying, when the resource is addible, the determined number of additional resources by a visual and/or auditory unit; and notifying, when the resource is not addible, the determined allowable throughput variation by the visual and/or auditory unit.

8. The method of managing the manufacturing line according to claim 6, wherein the obtaining the capability variation characteristic includes:

obtaining a probability distribution of a throughput of each resource; and obtaining a parameter indicating a characteristic of the probability distribution.

9. The method of managing the manufacturing line according to claim 8, wherein the determining the number of additional resources includes obtaining, when p is set to a number greater than 0 and equal to or smaller than 100, a number as the number of additional resources, the number being obtained by subtracting a current number of resources from the number of resources in which a boundary corresponding to p % of the entire probability distribution is equal to or greater than the quota in the process area, and the determining the allowable throughput variation includes obtaining the allowable throughput variation as a variance allowable from an average throughput in the probability distribution to a throughput corresponding to a quota corresponding to p % of the entire probability distribution.

10. The method of managing the manufacturing line according to claim 9, wherein the determining the number of additional resources includes obtaining, by the number of additional resources m, m satisfying $$\sum_{i=1}^{n+m} \mu_i - k\sqrt{\sum_{i=1}^{n+m} \sigma_i^2} \geq t$$

where an identifier of a resource E is set to i, an average throughput of a resource Ei is set to μi, a standard deviation of the resource Ei is set to σi, a current number of resources is set to n, a coefficient corresponding to p is set to k, and the quota of the process area is set to t, and the determining the allowable throughput variation includes obtaining $$\sum_{i=1}^{n} \sigma_i^2$$

satisfying $$\sum_{i=1}^{n} \sigma_i^2 \leq \left( \frac{\sum_{i=1}^{n} \mu_i - t}{k} \right)^2$$

where the identifier of the resource E is set to i, the average throughput of the resource Ei is set to μi, the standard deviation of the resource Ei is set to σi, the current number of resources is set to n, the coefficient corresponding to p is set to k, and the quota of the process area is set to t.

11. The method of managing the manufacturing line according to claim 1, further comprising:

obtaining, based on the number of resources in the process area and the throughput result in the process area, a probability distribution of the number of resources operable in the process area with respect to a recipe corresponding to a combination of a job type and the process area; and obtaining, based on the obtained probability distribution, the number of necessary resources of the recipe for the achievement of the quota in the process area.

12. The method of managing the manufacturing line according to claim 11, further comprising notifying the obtained number of necessary resources by a visual and/or auditory unit.

13. The method of managing the manufacturing line according to claim 11, wherein the obtaining the probability distribution of the number of resources includes obtaining multi the probability distributions of the number of resources operable on the recipe while changing the number of resources to be allocated to the recipe among the number of resources in the process area, and the obtaining the number of necessary resources of the recipe includes obtaining, based on the obtained multi probability distributions, the number of necessary resources of the recipe for the achievement of the quota of the recipe.

14. The method of managing the manufacturing line according to claim 13, wherein the obtaining the number of necessary resources of the recipe includes:

selecting an appropriate probability distribution among the obtained multi probability distributions; and setting the number of resources corresponding to the selected probability distribution as the number of necessary resources of the recipe.

15. The method of managing the manufacturing line according to claim 14, wherein the selecting the appropriate probability distribution includes:

specifying, among the multi probability distributions, one or more probability distributions in which a ratio of a portion smaller than the quota of the recipe is smaller than a threshold; and selecting, among the one or more specified probability distributions, a probability distribution having the minimum number of corresponding resources as the appropriate probability distribution.

16. The method of managing the manufacturing line according to claim 11, further comprising:

obtaining a weight of the recipe according to the number of necessary resources of the recipe; and allocating a total processing capability of each resource to the recipe according to the weight of the recipe.

17. The method of managing the manufacturing line according to claim 16, wherein the obtaining the weight of the recipe includes obtaining a weight in accordance with a reciprocal of the number of necessary resources of the recipe.

18. The method of managing the manufacturing line according to claim 17, wherein the process area corresponds to multi the recipes, and the obtaining the weight of the recipe includes obtaining a weight in accordance with a ratio of the reciprocal of the number of necessary resources of the recipe to a sum of the reciprocals of the number of necessary resources of the multi recipes.

19. The method of managing the manufacturing line according to claim 18, wherein the obtaining the weight of the recipe includes obtaining a weight in accordance with a ratio of a first product of a time converted from the quota of the recipe and the reciprocal of the number of necessary resources of the recipe to a sum obtained by adding the first products with respect to the multi recipes.

20. The method of managing the manufacturing line according to claim 19, wherein the obtaining the weight of the recipe includes obtaining a weight in accordance with a ratio of a second product of a time converted from the quota of the recipe in consideration of an amount of jobs capable of being processed in parallel by the resource and the reciprocal of the number of necessary resources of the recipe to a sum obtained by adding the second products with respect to the multi recipes.

* * * * *